(12) United States Patent
Yeon et al.

(10) Patent No.: US 8,737,369 B2
(45) Date of Patent: May 27, 2014

(54) METHOD AND APPARATUS FOR TRANSMITTING AND RECEIVING CONTROL INFORMATION IN MULTI-ANTENNA SYSTEM

(75) Inventors: Myung-Hoon Yeon, Gyeonggi-do (KR); Youn-Sun Kim, Gyeonggi-do (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 493 days.

(21) Appl. No.: 13/074,686

(22) Filed: Mar. 29, 2011

(65) Prior Publication Data

US 2011/0235626 A1    Sep. 29, 2011

(30) Foreign Application Priority Data

Mar. 29, 2010    (KR) .................. 10-2010-0028205

(51) Int. Cl.
    *H04W 4/00*    (2009.01)
(52) U.S. Cl.
    USPC .................. 370/338; 370/328; 370/310.2

(58) Field of Classification Search
    USPC .................................. 370/338, 216
    See application file for complete search history.

(56) References Cited

U.S. PATENT DOCUMENTS

2012/0218882 A1*  8/2012  Ko et al. .................. 370/216

* cited by examiner

*Primary Examiner* — Dang Ton
*Assistant Examiner* — Pamit Kaur
(74) *Attorney, Agent, or Firm* — The Farrell Law Firm, P.C.

(57) ABSTRACT

A method and apparatus for transmitting control information by an enhanced Node B (eNB) in a wireless communication system supporting Multiple-Input Multiple-Output (MIMO) technology is provided, in which at least one parameter required for initial transmission of User Equipment (UE) is transmitted through a Packet Data Control Channel (PDCCH), at least two codewords are received from the UE and then decoded, one of a plurality of indicators, related to an operation of the UE, is determined based on decoding results of at least two codewords, the determined indicator is transmitted through a Physical Hybrid ARQ indicator channel (PHICH), and at least one codeword is received that the UE generates and transmits based on the parameter required for initial transmission of the UE and the indicator related to the operation of the UE.

20 Claims, 12 Drawing Sheets

METHOD AND APPARATUS FOR TRANSMITTING AND RECEIVING CONTROL INFORMATION IN MULTI-ANTENNA SYSTEM

PRIORITY

This application claims priority under 35 U.S.C. §119(a) to an application filed in the Korean Intellectual Property Office on Mar. 29, 2010 and assigned Serial No. 10-2010-0028205, the entire disclosure of which is incorporated herein by reference.

BACKGROUND OF THE INVENTION

1. Field of the Invention

The present invention relates generally to a method and apparatus for transmitting and receiving control information in a multi-antenna system or a Multiple-Input Multiple-Output (MIMO) system, and more particularly, to a method and apparatus in which an enhanced Node B (eNB) informs User Equipment (UE) of the success or failure in decoding received uplink data.

2. Description of the Related Art

A MIMO technique, which is a multi-antenna technique that has evolved from the existing Single-Input Single-Output (SISO) technique using a single transmit antenna and a single receive antenna, adopts multiple transmit antennas and multiple receive antennas to improve data transmission efficiency. In the MIMO technique, a transmitter or a receiver of a wireless communication system uses multiple antennas to improve its capacity and performance.

The MIMO technique is achieved by applying a technique that completes an entire message by gathering fragmentary data pieces received at several antennas without depending on a single-antenna route in order to receive the message. The MIMO technique may improve a data rate in specific coverage, and may expand system coverage for a specific data rate. In addition, the MIMO technique may be widely used for mobile communication terminals and repeaters.

Technology for controlling transmission errors during data transmission in a wireless communication system may include a Forward Error Correction (FEC) technique and an Automatic Repeat reQuest (ARQ) technique. The FEC technique attempts to correct errors detected from received data, and decodes correct data in case of success in the error correction. However, in case of a failure in error correction, incorrect information may be provided to users, or information may be missing. The ARQ technique transmits data using FEC codes having excellent error detection ability, and upon detecting an error in received data, a receiver sends a data retransmission request to a transmitter.

The FEC technique has a relatively low efficiency in a good channel environment, and degrades system reliability in case of a failure in error correction. On the other hand, the ARQ technique may ensure high reliability of the system and enable efficient transmission with low redundancy in good channel environment. However, in poor channel environment, system reliability may be significantly reduced due to the frequent retransmission requests. An advanced technique achieved by appropriately combining the two techniques to overcome these shortcomings is a Hybrid ARQ (HARQ) technique.

The HARQ technique performs error correction on received coded data (hereinafter referred to as a 'HARQ packet'), and determines whether to request retransmission of the HARQ packet, using simple error detection codes such as Cyclic Redundancy Check (CRC) codes. A receiver of a system using the HARQ technique determines the presence or absence of an error in a received HARQ packet, and then transmits a positive HARQ Acknowledgement ('ACK') signal or a negative HARQ Acknowledgement ('NACK') signal to a transmitter according to the presence/absence of an error. The transmitter retransmits the HARQ packet or transmits a new HARQ packet in response to the HARQ ACK/NACK signal (or a response signal). Upon receiving a HARQ packet, the receiver transmits the response signal using appropriate resources.

In an Orthogonal Frequency Division Multiplexing (OFDM)-based wireless communication system, the ACK/NACK signal is carried by several subcarriers, and in a Wideband Code Division Multiple Access (WCDMA) system, the ACK/NACK signal is carried by a specific code channel. Generally, in an arbitrary packet data transmission interval or Transmission Time Interval (TTI), data packets for several users are simultaneously transmitted. Therefore, response channels for the HARQ packets are transmitted in predetermined times after data received from UEs scheduled to receive data in the TTI is decoded.

Transmission of the response channels for a downlink and an uplink is described, in turn, below.

In response channels to downlink data channels, UEs having received the data channels from an eNB are allocated physical channel resources for transmitting response signals, from the eNB, and transmit the response signals over an uplink using the allocated physical channel resources.

In response channels to uplink data channels, after receiving the data channels from their associated UEs, an eNB transmits response channels for the data packets over a downlink using resources agreed between the eNB and the UEs.

In Long Term Evolution (LTE), which is the next-generation mobile communication system, a Physical HARQ Indicator CHannel (PHICH) is a physical channel for transmitting a downlink ACK/NACK signal. A UE receiving a PHICH is responsible for data transmission in an uplink. Therefore, the number of PHICHs is proportional to the number of UEs that are performing data transmission in an uplink. Herein, L of $L_{PHICH}$ represents the number (or length) of PHICHs. A PHICH is transmitted in a first OFDM symbol ($L_{PHICH}=1$), or transmitted over three OFDM symbols ($L_{PHICH}=3$). $L_{PHICH}$, which is a parameter defined for every cell, has been introduced to adjust a length of a PHICH because the PHICH can be hardly transmitted with only one OFDM symbol in case or a large-sized cell.

Configuration information (e.g., the amount of symbols used, the locations thereof, and the like) of a PHICH is provided to UEs by a Physical Broadcast CHannel (PBCH). A PHICH channel is also transmitted in a location designated for each cell.

A maximum of K uplink data channels may be simultaneously scheduled within one TTI. Here, K response channels are required in a downlink. Generally, as to response channels to an uplink, a plurality of Resource Elements (REs) constitute one response channel, and resources for the response channels are determined depending on the bandwidth of the system. In the current LTE system, 8 PHICHs constitute one PHICH group. If resources are allocated on a PHICH group basis, a UE may determine the location of its allocated PHICH using a PHICH group index $n_{PHICH}^{group}$ to which the UE itself is assigned. In a PHICH group are multiplexed 8 PHICHs, and a total of 8 sequences are multiplexed by mapping length-4 spread sequences to the real axis and the imaginary axis. Sequence indexes used for the multiplexing may be represented by $n_{PHICH}^{seq}$. System bandwidth may be represented by the number of Resource Block (RBs). If $N_{RB}^{DL}$ is defined as the number of RBs constituting the bandwidth, the number $N_{PHICH}^{group}$ of PHICH groups in the system is calculated by Equation (1) below.

$$N_{PHICH}^{group} = |N_g(N_{RB}^{DL}/8)| \qquad (1)$$

where $N_g \in \{1/6, 1/2, 1, 2\}$ represents a parameter for adjusting the channel capacity (or channel gain) that the system can set, and if this parameter is 2, the number of assignable UEs may be twice the maximum number of UEs that can be assigned to the current TTI. This is to enable support for Multi-User MIMO (MU-MIMO) in an uplink, and a maximum of 2 UEs may be assigned to one RB. In an LTE-Advanced (LTE-A) system to be introduced in the future, Single-User MIMO (SU-MIMO) is supportable in an uplink. The LTE-A system is designed to maintain backward compatibility with the LTE system. In the LTE-A system, SU-MIMO supported in an uplink may transmit a maximum of two CodeWords (CWs), and here, one UE requires two ACK/NACK responses from an eNB. Conventionally, Packet Data Control Channel (PDCCH) information is required together with a PHICH in initial transmission of a UE. An eNB transmits parameters required for initial transmission of a UE through a PDCCH. For example, the parameters may include the location and size of the resource allocated to the UE, Modulation and Coding Scheme-Redundancy Version (MCS-RV), New Data Indicator (NDI), and the like. If it is determined that an arbitrary CW received from a UE has been successfully decoded in a decoding process of an eNB, the eNB should toggle an NDI value when transmitting new information over a PDCCH. Specifically, if the current NDI value is 0, an NDI value transmitted on a PDCCH for initial transmission should be toggled to 1. If the current NDI value is 1, an NDI value transmitted on a PDCCH for initial transmission should be toggled to 0. However, for a channel whose change is insignificant, transmitting the resource and MCS-RV value required by a UE through a PDCCH in every initial transmission may lead to a waste of downlink resources, causing a reduction in the system capacity. Therefore, there is a need for a method of controlling CW transmission by a UE only with PHICH transmission without transmitting a PDCCH in every initial transmission.

SUMMARY OF THE INVENTION

An aspect of the present invention is to address at least the above-mentioned problems and/or disadvantages and to provide at least the advantages described below. Accordingly, an aspect of the present invention is to provide a method and apparatus for controlling 2-CW transmission by a UE only with PHICH transmission without transmitting a PDCCH in every initial transmission.

Another aspect of the present invention is to provide a method and apparatus capable of improving the system capacity by reducing the frequency of using a PDCCH.

Another aspect of the present invention is to provide a method and apparatus which, when used with Semi-Persistent Scheduling (SPS), enables deactivation of the SPS only with a PHICH, without the conventional upper-layer signaling.

Another aspect of the present invention is to provide a method and apparatus capable of reducing a waste of downlink resources by reducing the frequency of using a PDCCH.

In accordance with one aspect of the present invention, there is provided a method for transmitting control information by an enhanced Node B (eNB) in a wireless communication system supporting Multiple-Input Multiple-Output (MIMO) technology. The method includes transmitting at least one parameter required for initial transmission of a User Equipment (UE) through a Packet Data Control Channel (PDCCH); receiving at least two codewords from the UE and decoding the received codewords; determining one of indicators related to an operation of the UE based on decoding results of the at least two codewords; transmitting the determined indicator through a Physical hybrid ARQ indicator channel (PHICH); and receiving at least one codeword that the UE generates and transmits based on the parameter required for initial transmission of the UE and the indicator related to an operation of the UE.

In accordance with another aspect of the present invention, there is provided an enhanced Node B (eNB) apparatus for transmitting control information in a wireless communication system supporting Multiple-Input Multiple-Output (MIMO) technology. The eNB apparatus includes a transmitter for transmitting at least one parameter required for initial transmission of a User Equipment (UE) through a Packet Data Control Channel (PDCCH); a receiver for receiving at least two codewords from the UE; a decoder for decoding the at least two codewords; a Physical hybrid ARQ indicator channel (PHICH) generator for determining one of indicators related to an operation of the UE based on decoding results of the at least two codewords, and generating a PHICH including the determined indicator; and the transmitter for transmitting the generated PHICH to the UE. The receiver receives at least one codeword that the UE generates and transmits based on the parameter required for initial transmission of the UE and the indicator related to an operation of the UE.

In accordance with yet another aspect of the present invention, there is provided a method for receiving control information by a User Equipment (UE) in a wireless communication system supporting Multiple-Input Multiple-Output (MIMO) technology. The method includes receiving at least one parameter required for initial transmission of the UE from an enhanced Node B (eNB) through a Packet Data Control Channel (PDCCH); receiving a Physical hybrid ARQ indicator channel (PHICH) from the eNB; mapping an indicator related to an operation of the UE, which is included in the PHICH, to indicators related to operations of the UE, which are stored in the UE; applying an operation corresponding to the indicator related to an operation of the UE, which is included in the PHICH, according to the mapping results; and transmitting at least one codeword to the eNB based on the parameter required for initial transmission of the UE and the indicator related to an operation of the UE. The indicator related to an operation of the UE, which is included in the PHICH, is determined based on decoding results of the at least two codewords.

In accordance with another aspect of the present invention, there is provided a User Equipment (UE) apparatus for receiving control information in a wireless communication system supporting Multiple-Input Multiple-Output (MIMO) technology. The UE apparatus includes a receiver for receiving at least one parameter required for initial transmission of the UE from an enhanced Node B (eNB) through a Packet Data Control Channel (PDCCH), and receiving a Physical hybrid ARQ indicator channel (PHICH) from the eNB; a mapper for mapping an indicator related to an operation of the UE, which is included in the PHICH, to indicators related to operations of the UE, which are stored in the UE; a UE operation application unit for applying an operation corresponding to the indicator related to an operation of the UE, which is included in the PHICH, according to the mapping results; and a transmitter for transmitting at least one codeword to the eNB based on the parameter required for initial transmission of the UE and the indicator related to an operation of the UE. The indicator related to an operation of the UE, which is included in the PHICH, is determined based on decoding results of the at least two codewords.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Various embodiments of the present invention will be described in detail below with reference to the accompanying drawings. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In the following detailed description of embodiments of the present invention, standards for OFDM-based communication systems, especially for 3GPP Evolved UMTS Terrestrial Radio Access (EUTRA) (or LTE) and Advanced E-UTRA (or LTE-A), will be considered primarily. However, it will be appreciated by those skilled in the art that the subject matter of the present invention may be applied to any other communication systems having similar technical backgrounds and channel formats with a slight modification without departing from the spirit and scope of the present invention.

Figure 1:
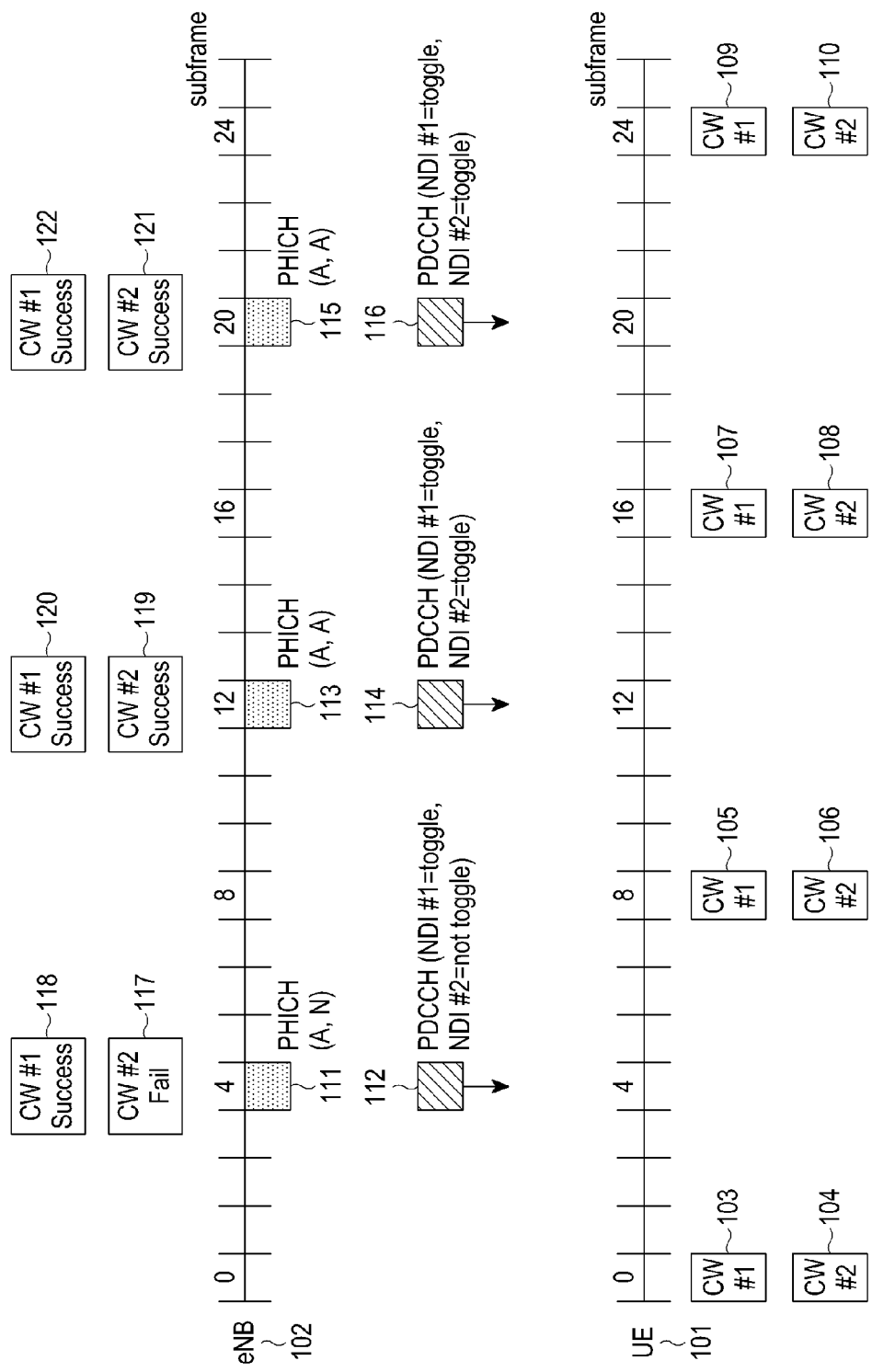
FIG. 1 is a diagram illustrating a general control information exchange between an eNB and a UE.

FIG. 1 illustrates generally, control information exchange between an eNB and a UE.

Briefly, based on the general PHICH technique, an eNB 102 informs a UE 101 of the CWs which have been successfully decoded.

The UE 101 receives PDCCH information from the eNB 102 and then performs initial transmission on a CW #1 103 and a CW #2 104 to the eNB 102. If decoding of the CW #1 is successful 118 and decoding of the CW #2 is failed 117 in the eNB 102, the eNB 102 transmits an ACK for the CW #1 and a NACK for the CW #2 to the UE 101 using a PHICH 111. Using a PDCCH, the eNB 102 toggles an NDI #1 for the CW #1 (from 0 to 1, or from 1 to 0), and does not toggle an NDI #2 for the CW #2. That is, the eNB 102 may transmit an ACK/NACK using a PHICH, and provide new grant information to the UE 101 using a PDCCH. After receiving the PHICH 111 and the PDCCH 112, the UE 101 performs initial transmission on a CW #1 105 whose decoding was successful, and retransmits the CW #2 106 whose decoding was failed.

If decoding of the CW #1 is successful 120 and decoding of the CW #2 is also successful 119 in the eNB 102, the eNB 102 transmits an ACK for the CW #1 and an ACK for the CW #2 to the UE 101 using a PHICH 113. Using a PDCCH 114, the eNB 102 toggles an NDI #1 and an NDI #2 as well. After receiving the PHICH 113 and the PDCCH 114, the UE 101 performs initial transmission on a CW #1 107 and a CW #2 108.

If decoding of the CW #1 is successful 122 and decoding of the CW #2 is successful 121 in the eNB 102, the eNB 102 transmits an ACK for the CW #1 and an ACK for the CW #2 to the UE 101 using a PHICH 115. In addition, using a PDCCH 116, the eNB 102 toggles an NDI #1 for the CW #1 and an NDI #2 for the CW #2. After receiving the PHICH 115 and the PDCCH 116, the UE 101 performs initial transmission on a CW #1 109 and a CW #2 110. As illustrated in FIG. 1, conventionally, if a PHICH is used when two CWs on an uplink channel are transmitted, a PDCCH should be transmitted in every initial transmission. That is, despite no change in the RB and MCS-RV required for transmission of uplink channel data, the eNB 102 should retransmit a PDCCH to the UE 101 in every retransmission, which may cause a waste of PDCCH resources and reduce the system capacity.

Accordingly, the present invention provides a method and apparatus for controlling 2-CW transmission by a UE only with PHICH transmission without transmitting a PDCCH in every initial transmission.

Specifically, when an eNB transmits a PHICH to a UE, the PHICH includes state information indicating an operation of the UE. The state information indicating an operation of a UE may represent a plurality of states, as described below, wherein Tables 2 to 5 show information agreed between a UE and an eNB.

In the present invention, 16 states are defined by combinations of ACK, NACK, STOP, and CONTINUE. In the first embodiment based on the 16 states, 8 states are defined by combinations of ACK, NACK, STOP, and CONTINUE. In the second embodiment based on the 16 states, 7 states are defined by combinations of ACK, NACK, STOP, and CONTINUE. In the third embodiment based on the 16 states, 5 states are defined by combinations of ACK, NACK, STOP, and CONTINUE.

Table 1 below provides a reference for the combination of terms used in the present invention.

TABLE 1

| Terminology | Description |
|---|---|
| ACK and Stop | Correctly decoded |
| | Stop transmission and wait for new grant |
| ACK and Continue | Correctly decoded |
| | Initiate new packet |
| NACK and Stop | Incorrectly decoded |
| | Stop transmission and wait for new grant |
| NACK and Continue | Incorrectly decoded |
| | Retransmit until the number of maximum retransmission |
| | After maximum retransmission, initiate new packet |

'ACK and Stop' indicates that a CW has been successfully decoded in an eNB, and a UE is instructed to stop transmission of the CW and wait for new uplink grant information (i.e., RB, MCS-RV, and the like) to be received over a PDCCH.

'ACK and Continue' indicates that a CW has been successfully decoded in an eNB, and a UE is instructed to perform initial transmission on a new packet associated with the CW.

'NACK and Stop' indicates that an eNB has failed in decoding a CW, and a UE is instructed to stop transmission of the CW and wait for new uplink grant information (i.e., RB, MCS-RV, and the like) to be received over a PDCCH.

'NACK and Continue' indicates that an eNB has failed in decoding a CW, and a UE is instructed to retransmit the associated packet as many times as a predetermined maximum retransmission count, and to perform initial transmission on a new packet associated with the CW after the maximum retransmission.

Table 2 below shows an example in which the four combinations (ACK and Stop, ACK and Continue, NACK and Stop, NACK and Continue) used in Table 1 are applied to two CWs in an extended way.

While ACK1 indicates a success in decoding a CW #1 in an eNB, ACK2 indicates a success in decoding a CW #2 in an eNB. While NACK1 indicates a failure in decoding a CW #1 in an eNB, NACK2 indicates a failure in decoding a CW #2 in an eNB. By combining the four terms (ACK and Stop, ACK and Continue, NACK and Stop, NACK and Continue) given in Table 1 with an ACK/NACK for a CW #1 and an ACK/NACK for a CW #2, 16 states are available as represented in Table 2 below.

TABLE 2

| | ACK/NACK | | CW#1 | CW#2 |
|---|---|---|---|---|
| state #1 | ACK1 | ACK2 | Stop | Stop |
| state #2 | ACK1 | NACK2 | Stop | Stop |
| state #3 | NACK1 | ACK2 | Stop | Stop |
| state #4 | NACK1 | NACK2 | Stop | Stop |
| state #5 | ACK1 | ACK2 | Continue | Continue |
| state #6 | ACK1 | NACK2 | Continue | Continue |
| state #7 | NACK1 | ACK2 | Continue | Continue |
| state #8 | NACK1 | NACK2 | Continue | Continue |
| state #9 | ACK1 | ACK2 | Continue | Stop |
| state #10 | ACK1 | NACK2 | Continue | Stop |
| state #11 | NACK1 | ACK2 | Continue | Stop |
| state #12 | NACK1 | NACK2 | Continue | Stop |
| state #13 | ACK1 | ACK2 | Stop | Continue |
| state #14 | NACK1 | ACK2 | Stop | Continue |
| state #15 | ACK1 | NACK2 | Stop | Continue |
| state #16 | NACK1 | NACK2 | Stop | Continue |

For example, in Table 2, ACK1, ACK2, Stop (CW #1), and Stop (CW #2) constituting state #1 represent ACK and Stop for a CW #1, and ACK and Stop for a CW #2. The wording "ACK and Stop for a CW #1" indicates that a CW #1 has been successfully decoded in an eNB, and a UE is instructed to stop transmission of the CW #1 and wait for new uplink grant information to be received over a PDCCH. The wording "ACK and Stop for a CW #2" indicates that a CW #2 has been successfully decoded in an eNB, and a UE is instructed to stop transmission of the CW #2 and wait for new uplink grant information to be received over a PDCCH.

ACK1, NACK2, Stop (CW #1), and Stop (CW #2) constituting state #2 represent ACK and Stop for a CW #1, and NACK and Stop for a CW #2. The wording "ACK and Stop for a CW #1" indicates that a CW #1 has been successfully decoded in an eNB, and a UE is instructed to stop transmission of the CW #1 and wait for new uplink grant information to be received over a PDCCH. The wording "NACK and Stop for a CW #2" indicates that an eNB has failed in decoding a CW #2, and a UE is instructed to stop transmission of the CW #2 and wait for new uplink grant information to be received over a PDCCH. In this manner, 16 states from state #1 to state #16 are referenced in Table 2.

Table 3 below shows an example in which the 16 states in Table 2 are reduced to 8 states. The reason for reducing the number of states expressible by a PHICH to eight is to represent the 8 states using 3-bit information.

TABLE 3

| ACK/NACK | | CW#1 | CW#2 | States | Description |
|---|---|---|---|---|---|
| ACK1 | ACK2 | Stop | Stop | State #1 | Stop CW #1 |
| ACK1 | NACK2 | Stop | Stop | | Stop CW #2 |
| NACK1 | ACK2 | Stop | Stop | | |
| NACK1 | NACK2 | Stop | Stop | | |
| ACK1 | ACK2 | Continue | Continue | State #2 | Initiate CW #1 |
| | | | | | Initiate CW #2 |
| ACK1 | NACK2 | Continue | Continue | State #3 | Initiate CW #1 |
| | | | | | ReTx or Initiate CW #2 |
| NACK1 | ACK2 | Continue | Continue | State #4 | ReTx or Initiate CW #1 |
| | | | | | Initiate CW #2 |
| NACK1 | NACK2 | Continue | Continue | State #5 | ReTx or Initiate CW #1 |
| | | | | | ReTx or Initiate CW #2 |
| ACK1 | ACK2 | Continue | Stop | State #8 | Initiate CW #1 |
| ACK1 | NACK2 | Continue | Stop | | Stop CW #2 |
| NACK1 | ACK2 | Continue | Stop | State #6 | ReTx or Initiate CW #1 |
| NACK1 | NACK2 | Continue | Stop | | Stop CW #2 |
| ACK1 | ACK2 | Stop | Continue | State #8 | Stop CW #1 |
| NACK1 | ACK2 | Stop | Continue | | Initiate CW #2 |
| ACK1 | NACK2 | Stop | Continue | State #7 | Stop CW #1 |
| NACK1 | NACK2 | Stop | Continue | | ReTx or Initiate CW #2 |

In Table 3, state #1 is defined as a state in which a UE stops transmission of both of a CW #1 and a CW #2 regardless of their ACK/NACK. Specifically, an eNB transmits state #1 to a UE over a PHICH, and upon receiving information indicating that the PHICH information is state #1, the UE stops transmission of the CW #1 and the CW #2, and waits for new grant information for the CW #1 and the CW #2 to be received over a PDCCH.

State #2 indicates 'ACK1 and Continue' and 'ACK2 and Continue'. Specifically, an eNB transmits state #2 to a UE over a PHICH, and upon receiving information indicating that the PHICH information is state #2, the UE performs initial transmission on the CW #1 and performs initial transmission even on the CW #2. In the initial transmission, the UE uses grant information previously allocated for the CW #1 and the CW #2, instead of being allocated new grant information from the eNB through a PDCCH.

State #3 indicates 'ACK1 and Continue' and 'NACK2 and Continue'. Specifically, an eNB transmits state #3 to a UE over a PHICH, and upon receiving information indicating that the PHICH information is state #3, the UE performs initial transmission on the CW #1, and performs retransmission or initial transmission on the CW #2.

State #4 indicates 'NACK1 and Continue' and 'ACK2 and Continue'. Upon receiving state #4 from an eNB over a PHICH, a UE performs retransmission or initial transmission on the CW #1, and performs initial transmission on the CW #2.

State #5 indicates 'NACK1 and Continue' and 'NACK2 and Continue'. Upon receiving state #5 from an eNB over a PHICH, a UE performs retransmission or initial transmission on the CW #1, and performs retransmission or initial transmission on the CW #2.

State #6 indicates 'NACK1 and Continue' for a CW #1, and 'ACK and Stop' or 'NACK and Stop' for a CW #2. Specifically, a UE stops transmission of the CW #2 regardless of its ACK/NACK. Upon receiving state #6 from an eNB over a PHICH, the UE performs retransmission or initial transmission on the CW #1, and stops transmission of the CW #2 and waits for a new grant to be allocated on a PDCCH.

State #7 indicates 'ACK1 and Stop' or 'NACK1 and Stop' for a CW #1, and 'NACK#2 and Continue' for a CW #2. Upon receiving state #7 from an eNB over a PHICH, a UE stops transmission of the CW #1 and performs retransmission or initial transmission on the CW #2.

State #8 may indicate, in a first method, 'ACK1 and Continue' for a CW #1, and 'ACK#2 and Stop' or 'NACK#2 and Stop' for a CW #2. Here, a UE performs initial transmission on the CW #1, and stops transmission of the CW #2 regardless of its ACK/NACK and waits for a new grant to be allocated in a PDCCH.

State #8 may indicate, in a second method, 'ACK1 and Stop' or 'NACK1 and Stop' for a CW #1, and 'ACK2 and Continue' for a CW #2. Here, a UE stops transmission of the CW #1 regardless of its ACK/NACK and waits for a new grant to be allocated in a PDCCH. Conversely, the UE performs initial transmission on the CW #2.

Upon receiving state #8 as described above, a UE should select one of the following two operations. First, the UE performs initial transmission on the CW #1, and stops transmission of the CW #2. Second, the UE stops transmission of the CW #1, and performs initial transmission on the CW #2. Accordingly, the UE should perform initial transmission on one CW, and stop transmission of the other CW. There are three possible ways to select one of the two CWs.

First, a UE may always transmit a CW #1.

Second, a UE may compare a CW #1 with a CW #2 in terms of Transport Block Size (TBS), to transmit a CW with a smaller TBS.

Third, a UE may compare a CW #1 with a CW #2 in terms of TBS, to transmit a CW with a greater TBS. If the CW #1 and the CW #2 are equal in TBS, the UE may transmit the CW #1.

Table 4 below shows an example in which the 16 states in Table 2 are defined as 7 states.

TABLE 4

| ACK/NACK | | UL grant | | States | Description |
|---|---|---|---|---|---|
| ACK1 | ACK2 | Stop | Stop | State #1 | Stop CW #1 |
| ACK1 | NACK2 | Stop | Stop | | Stop CW #2 |
| NACK1 | ACK2 | Stop | Stop | | |
| NACK1 | NACK2 | Stop | Stop | | |
| ACK1 | ACK2 | Continue | Continue | State #2 | Initiate CW #1 |
| | | | | | Initiate CW #2 |
| ACK1 | NACK2 | Continue | Continue | State #3 | Initiate CW #1 |
| | | | | | ReTx or Initiate CW #2 |
| NACK1 | ACK2 | Continue | Continue | State #4 | ReTx or Initiate CW #1 |
| | | | | | Initiate CW #2 |
| NACK1 | NACK2 | Continue | Continue | State #5 | ReTx or Initiate CW #1 |
| | | | | | ReTx or Initiate CW #2 |
| ACK1 | ACK2 | Continue | Stop | State #6 | Initiate CW #1 |
| ACK1 | NACK2 | Continue | Stop | | Stop CW #2 |
| NACK1 | ACK2 | Continue | Stop | State #7 | ReTx or Initiate CW #1 |
| NACK1 | NACK2 | Continue | Stop | | Stop CW #2 |
| ACK1 | ACK2 | Stop | Continue | State #6 | Stop CW #1 |
| NACK1 | ACK2 | Stop | Continue | | Initiate CW #2 |
| ACK1 | NACK2 | Stop | Continue | State #7 | Stop CW #1 |
| NACK1 | NACK2 | Stop | Continue | | ReTx or Initiate CW #2 |

In Table 4, state #1 is defined as a state in which a UE stops transmission of both of a CW #1 and a CW #2 regardless of their ACK/NACK. Specifically, an eNB transmits state #1 to a UE over a PHICH, and upon receiving information indicating that the PHICH information is state #1, the UE stops transmission of the CW #1 and the CW #2, and waits for new grant information for the CW #1 and the CW #2 to be received over a PDCCH.

State #2 indicates 'ACK1 and Continue' and 'ACK2 and Continue'. Specifically, an eNB transmits state #2 to a UE over a PHICH, and upon receiving information indicating that the PHICH information is state #2, the UE performs initial transmission on the CW #1, and performs initial transmission even on the CW #2. In the initial transmission, the UE uses previously allocated grant information, instead of being allocated new grant information from the eNB through a PDCCH.

State #3 indicates 'ACK1 and Continue' and 'NACK2 and Continue'. Specifically, an eNB transmits state #3 to a UE over a PHICH, and upon receiving information indicating that the PHICH information is state #3, the UE performs initial transmission on the CW #1, and performs retransmission or initial transmission on the CW #2.

State #4 indicates 'NACK1 and Continue' and 'ACK2 and Continue'. Specifically, upon receiving state #4 from an eNB over a PHICH, a UE performs retransmission or initial transmission on the CW #1, and performs initial transmission on the CW #2.

State #5 indicates 'NACK1 and Continue' and 'NACK2 and Continue'. Upon receiving state #5 from an eNB over a PHICH, a UE performs retransmission or initial transmission on the CW #1, and performs retransmission or initial transmission on the CW #1.

State #6 indicates 'ACK1 and Continue' for a CW #1, and 'ACK#2 and Stop' or 'NACK#2 and Stop' for a CW #2. Here, a UE performs initial transmission on the CW #1, and stops transmission of the CW #2 regardless of its ACK/NACK and waits for a new grant to be allocated in a PDCCH. In the alternative, state #6 may indicate 'ACK1 and Stop' or 'NACK1 and Stop' for a CW #1, and 'ACK2 and Continue' for a CW #2. Here, a UE stops transmission of the CW #1 regardless of its ACK/NACK, and waits for a new grant to be allocated in a PDCCH. The UE performs initial transmission on the CW #2. Upon receiving state #6 as described above, a UE should select one of the following two operations. First, the UE performs initial transmission on the CW #1, and stops transmission of the CW #2. Second, the UE stops transmission of the CW #1, and performs initial transmission on the CW #2. Accordingly, the UE should perform initial transmission on one CW, and stop transmission of the other CW. There are three possible ways to select one of the two CWs. First, a UE may always transmit a CW #1. Second, a UE may compare a CW #1 with a CW #2 in terms of TBS, to transmit a CW with a smaller TBS. Third, a UE may compare a CW #1 with a CW #2 in terms of TBS, to transmit a CW with a greater TBS. If the CW #1 and the CW #2 are equal in TBS, the UE may transmit the CW #1.

State #7 indicates 'NACK#1 and Continue' for a CW #1, and 'ACK2 and Stop' or 'NACK2 and Stop' for a CW #2. Here, a UE performs retransmission or initial transmission on the CW #1, and stops transmission of the CW #2. In an alternative analysis, state #7 indicates 'ACK1 and Stop' or 'NACK1 and Stop' for a CW #1, and 'NACK2 and Continue' for a CW #2. Here, a UE stops transmission of the CW #1 regardless of its ACK/NACK, and performs retransmission or initial transmission on the CW #2.

Upon receiving state #7 as described above, a UE should select one of the following two operations. First, the UE performs retransmission or initial transmission on the CW #1, and stops transmission of the CW #2. Second, the UE stops transmission of the CW #1, and performs retransmission or initial transmission on the CW #2. Accordingly, the UE should perform initial transmission on one CW, and stop transmission of the other CW. There are three possible ways to select one of the two CWs. First, a UE may always transmit a CW #1. Second, a UE may compare a CW #1 with a CW #2 in terms of TBS, to transmit a CW with a smaller TBS. Third, a UE may compare a CW #1 with a CW #2 in terms of TBS, to transmit a CW with a greater TBS. If the CW #1 and the CW #2 are equal in TBS, the UE may transmit the CW #1.

Table 5 below shows an example in which the 16 states in Table 2 are defined as 5 states.

TABLE 5

| ACK/NACK | | UL grant | | States | Description |
|---|---|---|---|---|---|
| ACK1 | ACK2 | Stop | Stop | State #1 | Stop CW #1 |
| ACK1 | NACK2 | Stop | Stop | | Stop CW #2 |
| NACK1 | ACK2 | Stop | Stop | | |
| NACK1 | NACK2 | Stop | Stop | | |
| ACK1 | ACK2 | Continue | Continue | State #2 | Initiate CW #1 |
| | | | | | Initiate CW #2 |
| ACK1 | NACK2 | Continue | Continue | | |
| NACK1 | ACK2 | Continue | Continue | | |
| NACK1 | NACK2 | Continue | Continue | State #3 | ReTx or Initiate CW #1 |
| | | | | | ReTx or Initiate CW #2 |
| ACK1 | ACK2 | Continue | Stop | | |
| ACK1 | NACK2 | Continue | Stop | | |
| NACK1 | ACK2 | Continue | Stop | State #4 | ReTx or Initiate CW #1 |
| NACK1 | NACK2 | Continue | Stop | | Stop CW #2 |
| ACK1 | ACK2 | Stop | Continue | | |
| NACK1 | ACK2 | Stop | Continue | | |
| ACK1 | NACK2 | Stop | Continue | State #5 | Stop CW #1 |
| NACK1 | NACK2 | Stop | Continue | | ReTx or Initiate CW #2 |

In Table 5, state #1 is defined as a state in which a UE stops transmission of both of a CW #1 and a CW #2 regardless of their ACK/NACK. Specifically, an eNB transmits state #1 to a UE over a PHICH, and upon receiving information indicating that the PHICH information is state #1, the UE stops transmission of the CW #1 and the CW #2, and waits for new grant information for the CW #1 and the CW #2 to be received over a PDCCH.

State #2 indicates 'ACK1 and Continue' and 'ACK2 and Continue'. Specifically, an eNB transmits state #2 to a UE over a PHICH, and upon receiving information indicating that the PHICH information is state #2, the UE performs initial transmission on the CW #1, and performs initial transmission even on the CW #2. In the initial transmission, the UE uses previously allocated grant information, instead of being allocated new grant information from the eNB through a PDCCH.

State #3 indicates 'NACK1 and Continue' and 'NACK2 and Continue'. Specifically, upon receiving state #3 from an eNB over a PHICH, a UE performs retransmission or initial transmission on the CW #1, and performs retransmission or initial transmission on the CW #2.

State #4 indicates 'NACK#1 and Continue' for a CW #1, and 'ACK2 and Stop' or 'NACK2 and Stop' for a second CW #2. Here, a UE performs retransmission or initial transmission on the CW #1, and stops transmission of the CW #2.

State #5 indicates 'ACK1 and Stop' or 'NACK1 and Stop' for a CW #1, and 'NACK2 and Continue' for a CW #2. Here, a UE stops transmission of the CW #1, and performs retransmission or initial transmission on the CW #2. As shown in Table 5, the advantage of the PHICH using the five states is that by informing a UE of five states by adding only state #2 to the definitions (i.e., state #1, state #3, state #4, and state #5) of ACK/NACK, the frequency of using a PDCCH between an eNB and a UE may be reduced, which leads to an increase in the system capacity. Besides decoding performance, a PHICH of a block coding technique representing only five states may be equal to the performance of a block coding technique capable of representing four states using the existing PHICH technique. While the table information shown in Tables 2 to 5 may be stored in an eNB and a UE in advance in the present invention, it will be understood by those skilled in the art that various changes in the table information may be made without departing from the spirit and scope of the present invention.

Figure 2:
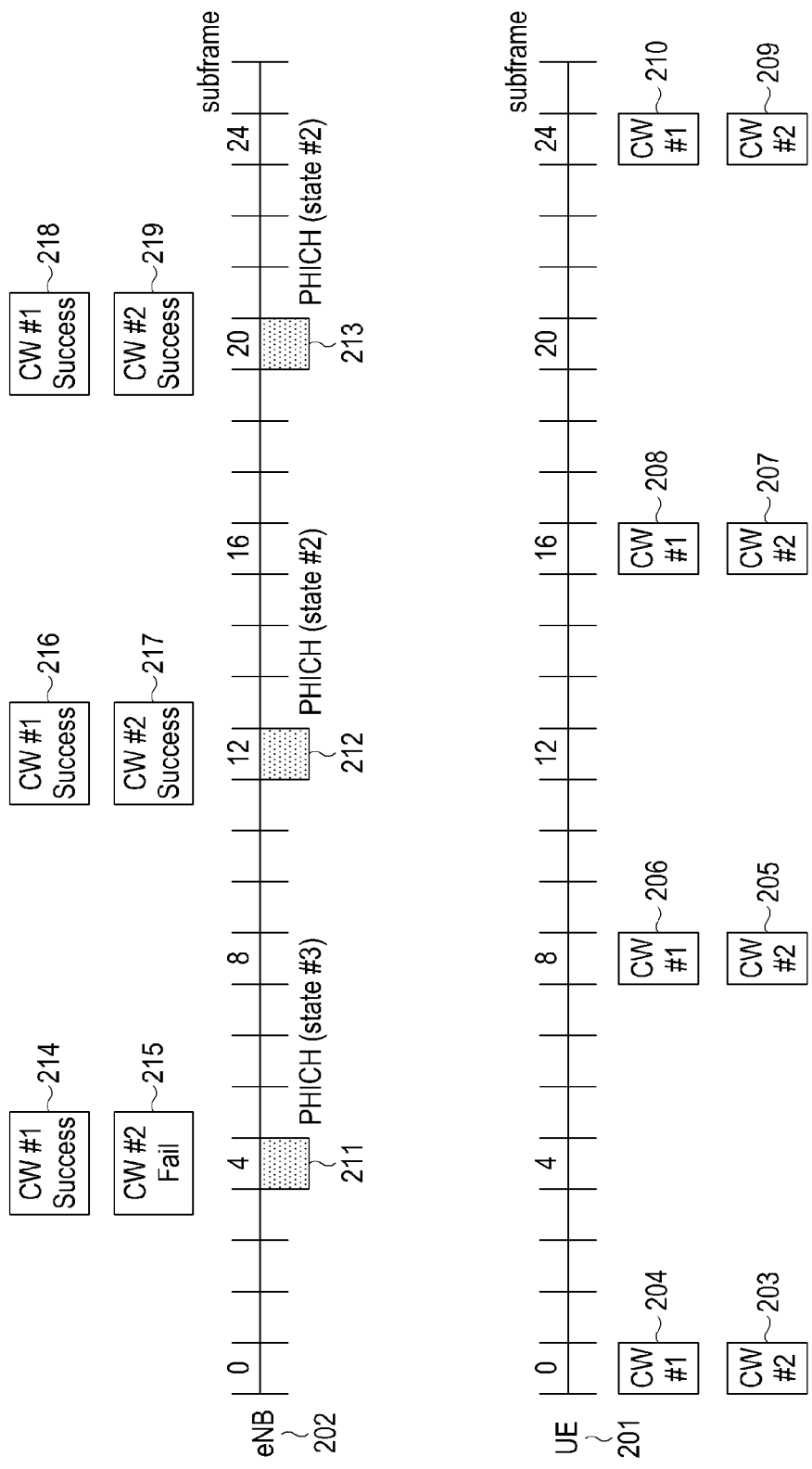
FIG. 2 is a diagram illustrating a control information exchange between an eNB and a UE according to an embodiment of the present invention.

FIG. 2 illustrates a control information exchange between an eNB and a UE according to an embodiment of the present invention.

In FIG. 2, eNB 202 controls 2-CW transmission by a UE 201 using a PHICH proposed by the present invention.

The UE 201 receives PDCCH information from the eNB 202 and then performs initial transmission on a CW #1 204 and a CW #2 203 to the eNB 202. If decoding of the CW #1 is successful 214 and decoding of the CW #2 is failed 215 in the eNB 202, the eNB 202 selects state #3 in Table 3 and transmits it to the UE 201 with a PHICH 211. Upon receiving state #3 in Table 3 over the PHICH 211, the UE 201 performs initial transmission on the CW #1 206 and performs retransmission or initial transmission on the CW #2 205.

If decoding of the CW #1 is successful 216 and decoding of the CW #2 is successful 217 in the eNB 202, the eNB 202 transmits state #2 in Table 3 to the UE 201 using a PHICH 212. The UE 201 performs initial transmission on the CW #1 208 and the CW #2 207.

If the eNB 202 has successfully decoded the CW #1 218 and the CW#2 219, the eNB 202 transmits state #2 in Table 3 to the UE 201 over a PHICH 213. Upon receiving the PHICH 213, the UE 201 performs initial transmission on the CW #1 210 and the CW #2 209.

Although the description of FIG. 2 has been made with reference to Table 3 by way of example, Tables 2, 4 and 5 may be used in the description. As illustrated in FIG. 2, the PHICH method of the present invention may control transmission of two CWs only with PHICH transmission without PDCCH transmission. For example, if CWs carried by an uplink channel are constant in terms of their RB and MCS information, then initial transmission, retransmission, and transmission stop for two CWs may be instructed by PHICH transmission without PDCCH transmission. With use of the PHICH of the present invention, even though the UE 201 is in the state it needs to receive a PDCCH, the eNB 202 does not transmit a PDCCH in every initial transmission like in the existing PHICH method, preventing waste of PDCCH resources and contributing to an increase in the system capacity.

Figure 3:
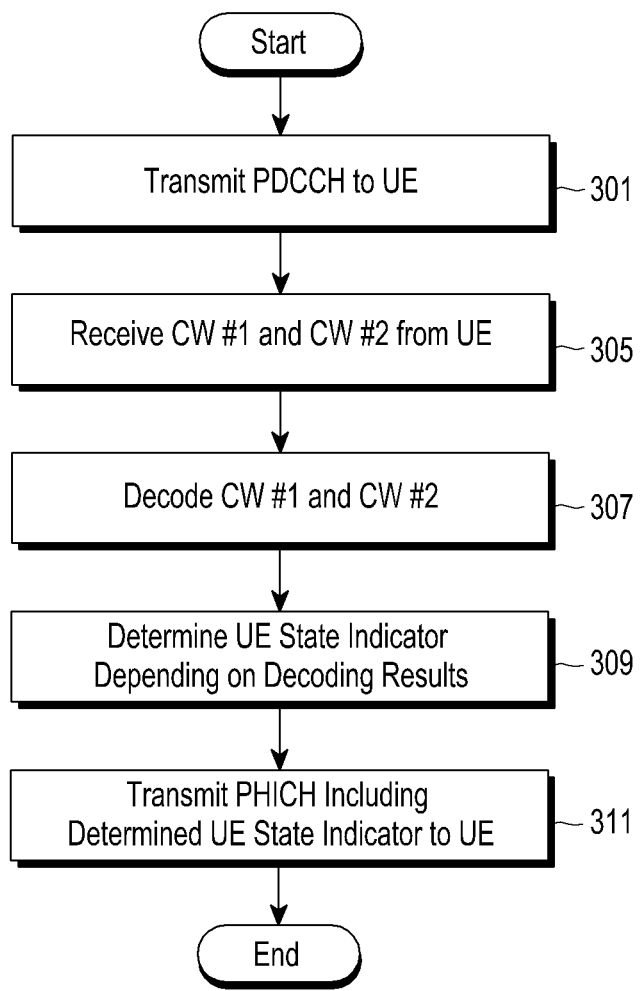
FIG. 3 is a flowchart illustrating a control information transmission method in an eNB according to an embodiment of the present invention.

FIG. 3 illustrates a control information transmission method in an eNB according to an embodiment of the present invention.

Referring to FIG. 3, an eNB 202 transmits a PDCCH to a UE 201 in step 301. Using the PDCCH, the eNB 202 transmits parameters required for initial transmission by a UE, including the location and size of the resource allocated to the UE, MCS-RV, and NDI. The eNB 202 receives a CW #1 and a CW #2 from the UE 201 in step 305, and decodes the received CW #1 and CW #2 in step 307. In step 309, the eNB 202 determines one of state #1 to state #16 (in Table 2), state #1 to state #8 (in Table 3), state #1 to state #7 (Table 4), and state #1 to state #5 (in Table 5), each of which includes a combination of the decoding results (ACK and NACK), Stop and Continue shown in Tables 2 to 5, i.e., determines a UE state indicator indicating an operation of a UE (also defined as state information indicating an operation of a UE, or information associated with an operation of a UE). In step 311, the eNB 202 transmits a PHICH including the determined UE state indicator to the UE 201.

Figure 4:
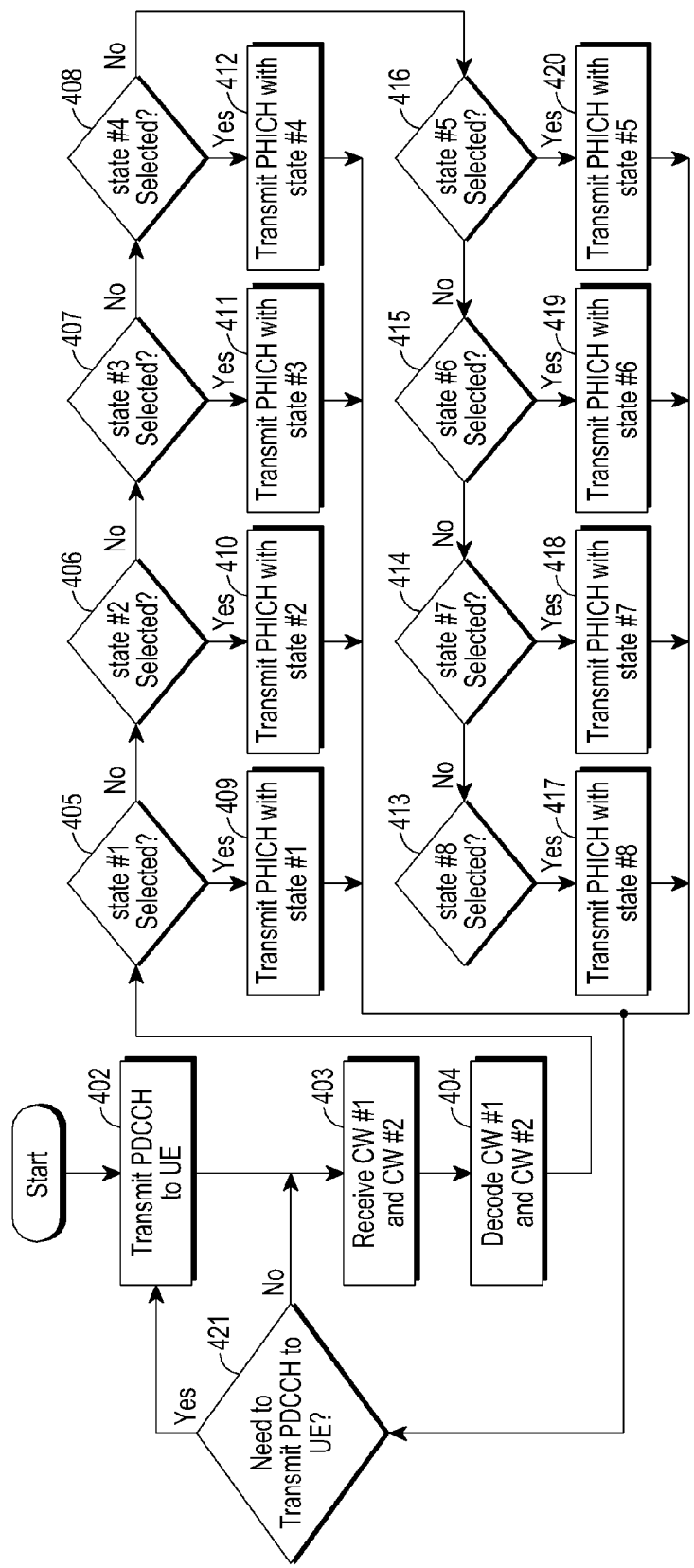
FIG. 4 is a flowchart illustrating a control information transmission method in an eNB according to a first embodiment of the present invention.

FIG. 4 illustrates a control information transmission method in an eNB according to a first embodiment of the present invention.

In FIG. 4, an eNB operation associated with the 8 states as defined in Table 3 is shown. A description of an eNB operation associated with the 16 states as defined in Table 2 will be omitted.

An eNB 202 provides new grant information to a UE 201 through a PDCCH in step 402. Upon receiving the PDCCH transmitted by the eNB 202, the UE 201 transmits a CW #1 and a CW #2 to the eNB 202, and the eNB 202 receives the CW #1 and the CW #2 from the UE 201 in step 403. Because the UE 201 may transmit only CW #1 or CW #2 according to the PDCCH information, the eNB 202 may also receive only CW #1 or CW #2. The eNB 202 decodes the CW #1 and the CW #2 in step 404. The eNB 202 selects one of state #1 to state #8 defined in Table 3 and configured to include a combination of the decoding results (ACK and NACK) of the CW #1 and the CW #2, Stop, and Continue. Upon selecting state #1 in step 405, the eNB 202 transmits the state #1 over a PHICH in step 409. Upon selecting state #2 in step 406, the eNB 202 transmits the state #2 over a PHICH in step 410. Upon selecting state #3 in step 407, the eNB 202 transmits the state #3 over a PHICH in step 411. Upon selecting state #4 in step 408, the eNB 202 transmits the state #4 over a PHICH in step 412. Upon selecting state #5 in step 416, the eNB 202 transmits the state #5 over a PHICH in step 420. Upon selecting state #6 in step 415, the eNB 202 transmits the state #6 over a PHICH in step 419. Upon selecting state #7 in step 414, the eNB 202 transmits the state #7 over a PHICH in step 418. Upon selecting state #8 in step 413, the eNB 202 transmits the state #8 over a PHICH in step 417.

After performing steps 409, 410, 411, 412, 417, 418, 419, and 420, the eNB 202 determines in step 421 whether it needs to transmit a PDCCH to the UE 201. If so, the eNB 202 transmits a new grant to the UE 201 using a PDCCH in step 402. If the eNB 202 does not need to transmit a PDCCH in step 421 and is expected to receive a CW #1 and a CW #2 from the UE 201 in response to the PHICH transmission (e.g., with the state #2 in step 410), then the eNB 202 proceeds to step 403.

Figure 5:
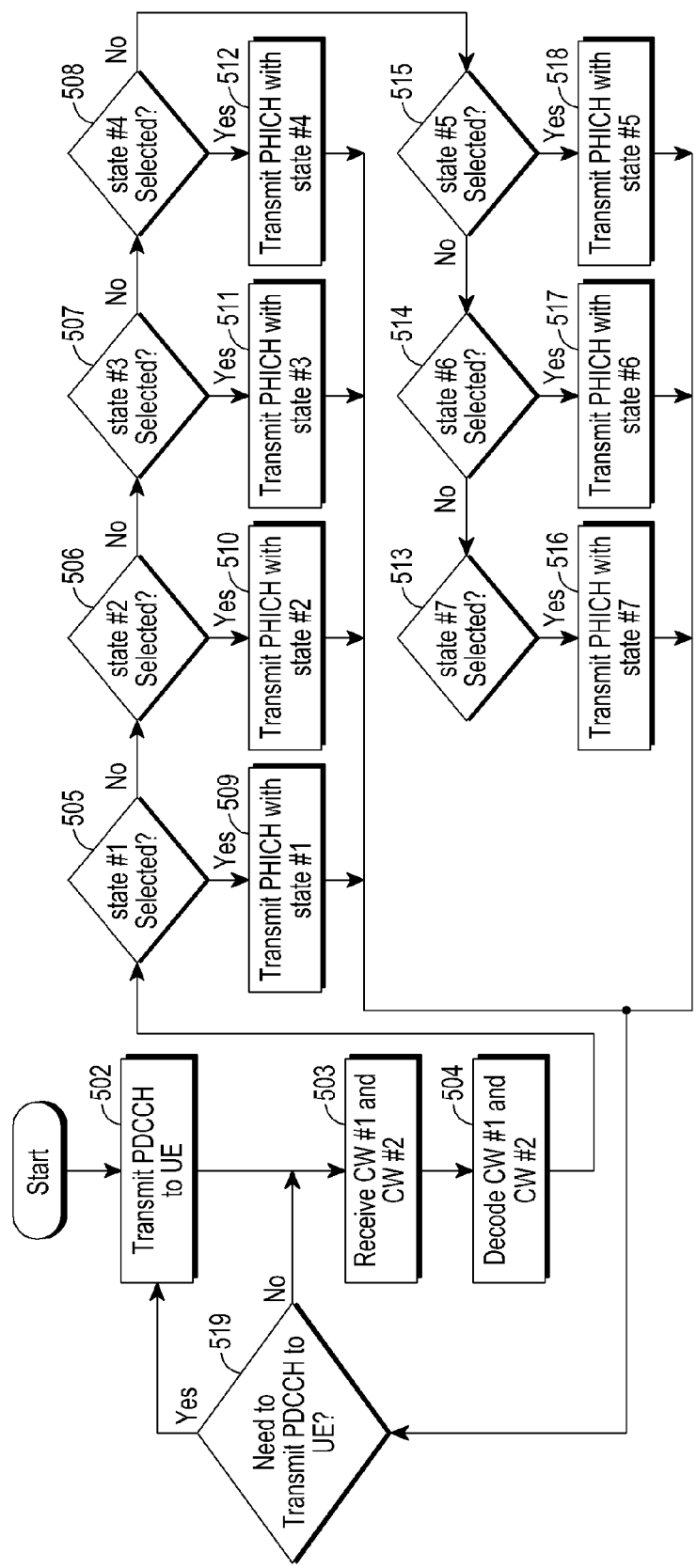
FIG. 5 is a flowchart illustrating a control information transmission method in an eNB according to a second embodiment of the present invention.

FIG. 5 illustrates a control information transmission method in an eNB according to a second embodiment of the present invention, in which an eNB operation associated with the 7 states defined in Table 4 is shown.

Referring to FIG. 5, an eNB 202 provides new grant information to a UE 201 through a PDCCH in step 502. Because the UE 201 transmits a CW #1 and a CW #2 to the eNB 202 upon receiving the PDCCH, the eNB 202 receives the CW #1 and the CW #2 from the UE 201 in step 503. The UE 201 may transmit only CW #1 or CW #2 according to the PDCCH information, so the eNB 202 may also receive only CW #1 or CW #2. The eNB 202 decodes the CW #1 and the CW #2 in step 504. The eNB 202 selects one of state #1 to state #7 defined in Table 4 and configured to include a combination of the decoding results (ACK and NACK) of the CW #1 and the CW #2, Stop, and Continue.

Upon selecting state #1 in step 505, the eNB 202 transmits the state #1 over a PHICH in step 509. Upon selecting state #2 in step 506, the eNB 202 transmits the state #2 over a PHICH in step 510. Upon selecting state #3 in step 507, the eNB 202 transmits the state #3 over a PHICH in step 511. Upon selecting state #4 in step 508, the eNB 202 transmits the state #4 over a PHICH in step 512. Upon selecting state #5 in step 515, the eNB 202 transmits the state #5 over a PHICH in step 518. Upon selecting state #6 in step 514, the eNB 202 transmits the state #6 over a PHICH in step 517. Upon selecting state #7 in step 513, the eNB 202 transmits the state #7 over a PHICH in step 516.

The eNB 202 determines in step 519 whether it needs to transmit a PDCCH to the UE 201. If so, the eNB 202 transmits a new grant to the UE 201 using a PDCCH in step 502. However, if the eNB 202 does not need to transmit a PDCCH to the UE 201 in step 519 and is expected to receive a CW #1 and a CW #2 from the UE 201 in response to the PHICH transmission (e.g., with state #2 in step 506), then the eNB 202 proceeds to step 503.

Figure 6:
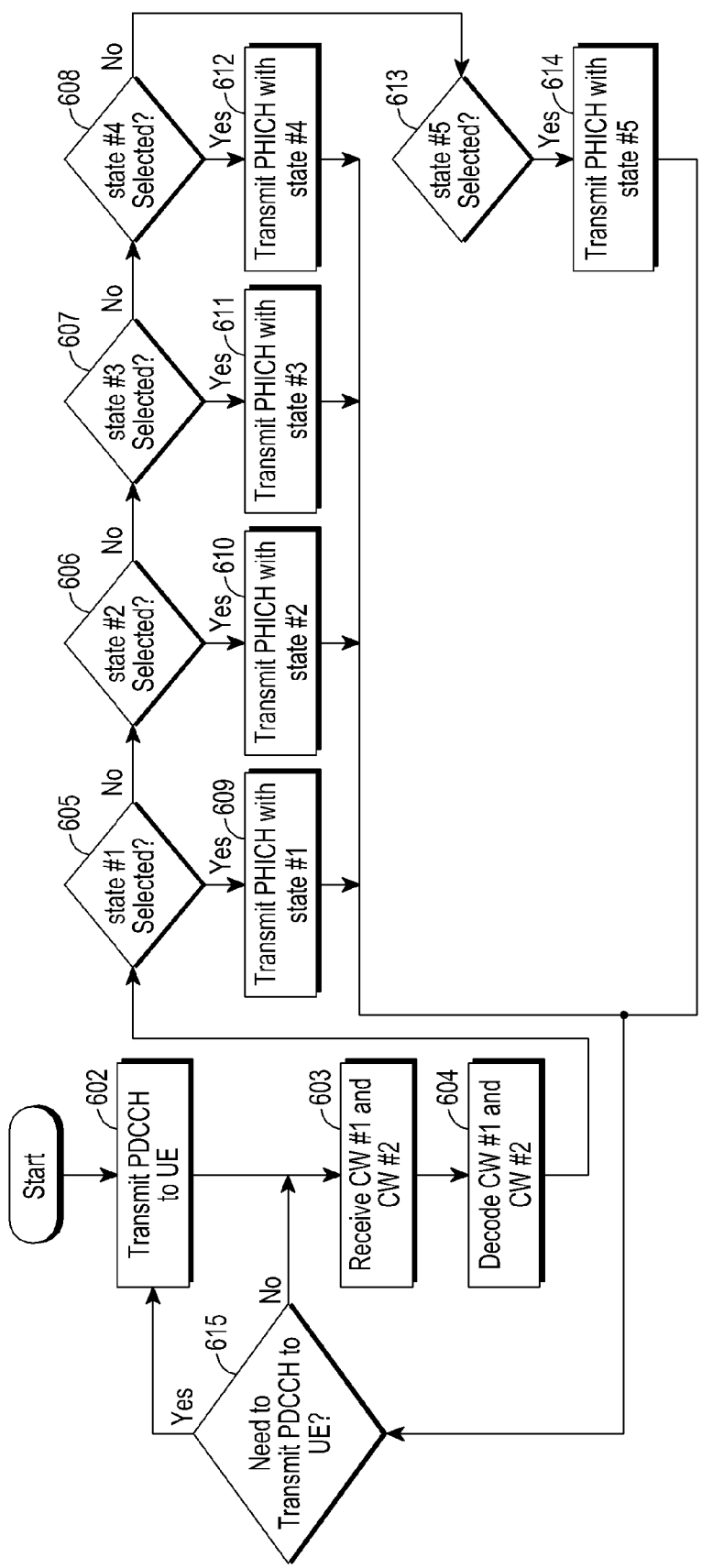
FIG. 6 is a flowchart illustrating a control information transmission method in an eNB according to a third embodiment of the present invention.

FIG. 6 illustrates a control information transmission method in an eNB according to a third embodiment of the present invention, in which an eNB operation associated with the 5 states as defined in Table 5 is illustrated.

Referring to FIG. 6, an eNB 202 provides new grant information to a UE 201 through a PDCCH in step 602. Because the UE 201 transmits a CW #1 and a CW #2 to the eNB 202 upon receiving the PDCCH, the eNB 202 receives the CW #1 and the CW #2 from the UE 201 in step 603. The UE 201 may transmit only CW #1 or CW #2 according to the PDCCH information, so the eNB 202 may also receive only CW #1 or CW #2.

The eNB 202 decodes the CW #1 and the CW #2 in step 604. The eNB 202 selects one of state #1 to state #5 defined in Table 5 and configured to include a combination of the decoding results (ACK and NACK) of the CW #1 and the CW #2, Stop, and Continue.

Upon selecting state #1 in step 605, the eNB 202 transmits the state #1 over a PHICH in step 609. Upon selecting state #2 in step 606, the eNB 202 transmits the state #2 over a PHICH in step 610. Upon selecting state #3 in step 607, the eNB 202 transmits the state #3 over a PHICH in step 611. Upon selecting state #4 in step 608, the eNB 202 transmits the state #4 over a PHICH in step 612. Upon selecting state #5 in step 613, the eNB 202 transmits the state #5 over a PHICH in step 614.

After performing steps 609, 610, 611, 612, and 614, the eNB 202 determines in step 615 whether it needs to transmit a PDCCH to the UE 201. If so, the eNB 202 transmits a new grant to the UE 201 using a PDCCH in step 602. However, if the eNB 202 does not need to transmit a PDCCH to the UE 201 in step 615 and is expected to receive a CW #1 and a CW #2 from the UE 201 in response to the PHICH transmission (e.g., with the state #2 in step 610), then the eNB 202 receives the CW #1 and the CW #2 in step 603.

Figure 7:
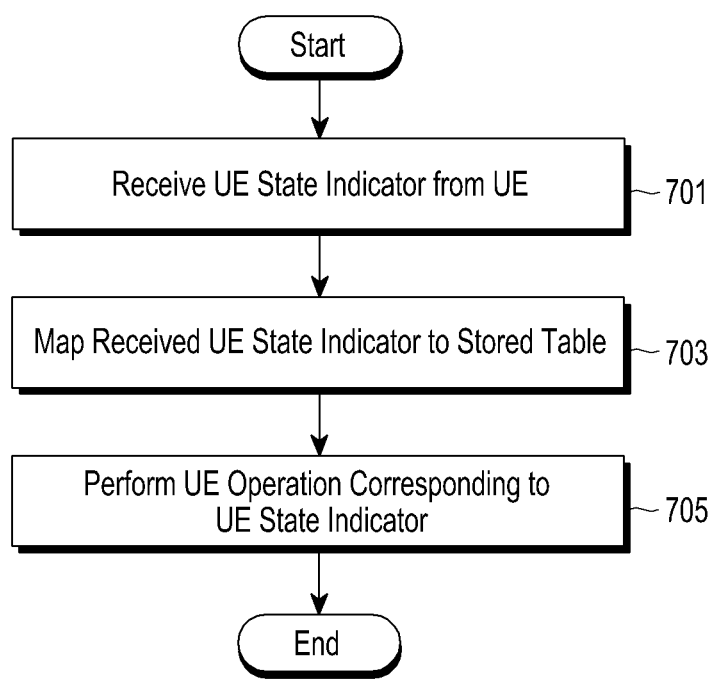
FIG. 7 is a flowchart illustrating a control information reception method in a UE according to an embodiment of the present invention.

FIG. 7 illustrates a control information reception method in a UE according to an embodiment of the present invention.

Referring to FIG. 7, a UE 201 receives a UE state indicator from an eNB 202 in step 701. The UE state indicator indicates one of state #1 to state #16 (in Table 2), state #1 to state #8 (in Table 3), state #1 to state #7 (Table 4), and state #1 to state #5 (in Table 5), each of which includes a combination of the decoding results (ACK and NACK), Stop and Continue. The UE 201 maps the UE state indicator received from the eNB 202 to the table (at least one of Table 2 to 5) stored in the UE 201 in step 703, and then performs a UE operation corresponding to the UE state indicator in step 705. The UE operation corresponding to the UE state indicator may depend on the type of the table stored in the UE 201.

Figure 8:
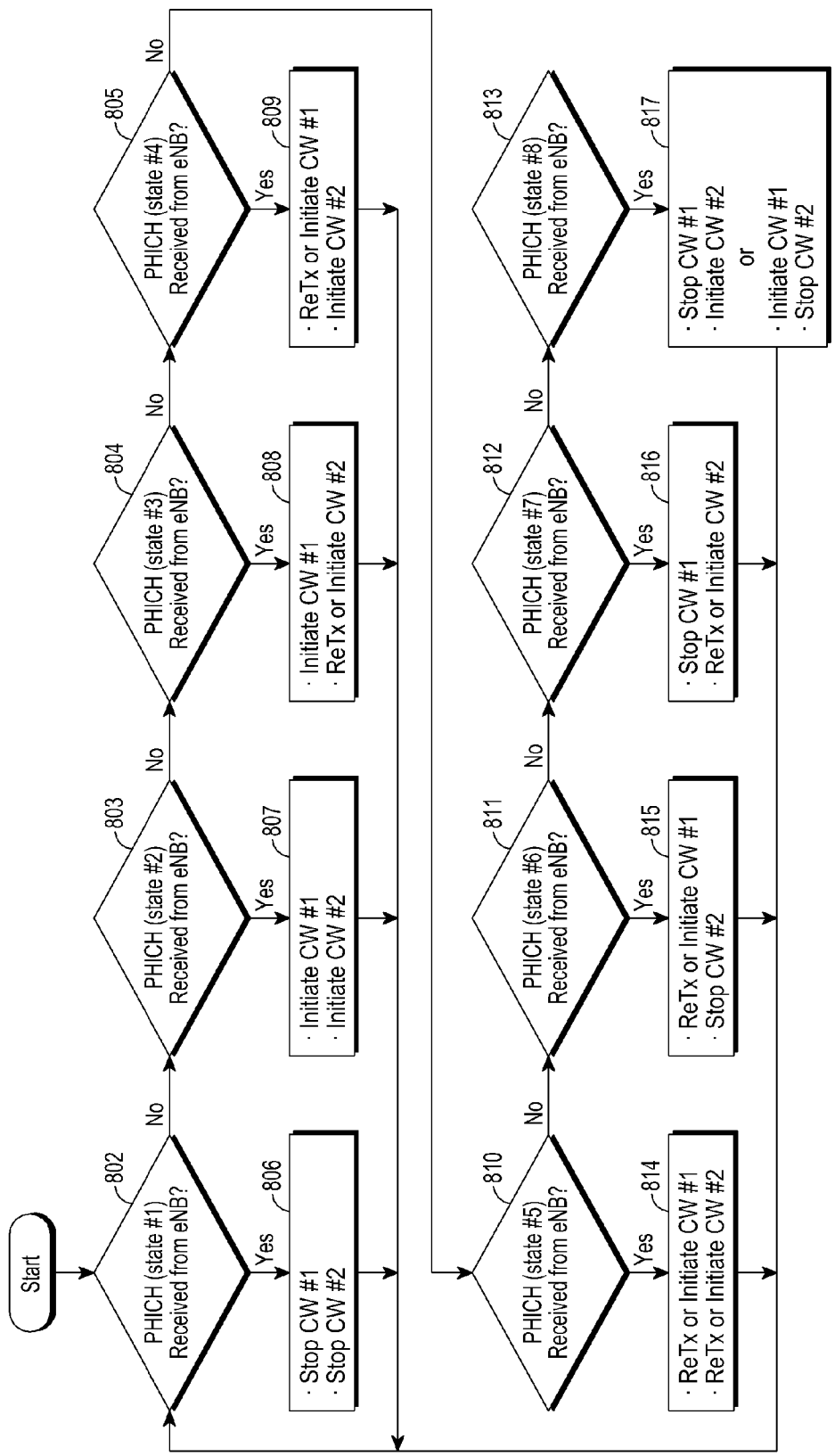
FIG. 8 is a flowchart illustrating a control information reception method in a UE according to a first embodiment of the present invention.

FIG. 8 illustrates a control information reception method in a UE according to a first embodiment of the present invention, in which a UE operation associated with the 8 states referenced in Table 3 is shown.

Generally, a UE 201 maps a UE state indicator included in a PHICH received from an eNB 202 to a table stored in the UE 201, and then performs a UE operation corresponding to the mapped UE state indicator.

In FIG. 8, upon recognizing in step 802 that the PHICH information received from the eNB 202 is state #1, the UE 201 performs a UE operation corresponding to the state #1 in step 806. Specifically, the UE 201 stops transmission of a CW #1 and a CW #2, and waits for new grant information for the CW #1 and the CW #2 to be received over a PDCCH. Upon recognizing in step 803 that the PHICH information received from the eNB 202 is state #2, the UE 201 performs a UE operation corresponding to the state #2 in step 807. Specifically, the UE 201 performs initial transmission on the CW #1, and performs initial transmission even on the CW #2. Upon recognizing in step 804 that the PHICH information received from the eNB 202 is state #3, the UE 201 performs a UE operation corresponding to the state #3 in step 808. Specifically, the UE 201 performs initial transmission on the CW #1, and performs retransmission or initial transmission on the CW #2. Upon recognizing in step 805 that the PHICH information received from the eNB 202 is state #4, the UE 201 performs a UE operation corresponding to the state #4 in step 809. Specifically, the UE 201 performs retransmission or initial transmission on the CW #1, and performs initial transmission on the CW #2. Upon recognizing in step 810 that the PHICH information received from the eNB 202 is state #5, the UE 201 performs a UE operation corresponding to the state #5 in step 814. Specifically, the UE 201 performs retransmission or initial transmission on the CW #1, and performs retransmission or initial transmission on the CW #2. Upon recognizing in step 811 that the PHICH information received from the eNB 202 is state #6, the UE 201 performs a UE operation corresponding to the state #6 in step 815. Specifically, the UE 201 performs retransmission or initial transmission on the CW #1, and stops transmission of the CW #2 and waits for a new grant to be allocated in a PDCCH.

Upon recognizing in step 812 that the PHICH information received from the eNB 202 is state #7, the UE 201 performs a UE operation corresponding to the state #7 in step 816. Specifically, the UE 201 stops transmission of the CW #1, and performs retransmission or initial transmission on the CW #2. Upon recognizing in step 813 that the PHICH information received from the eNB 202 is state #8, the UE 201 performs a UE operation corresponding to the state #8 in step 817. Specifically, the UE 201 performs initial transmission on the CW #1, and stops transmission of the CW #2 and waits for a new grant to be allocated in a PDCCH. In the alternative, upon recognizing in step 813 that the PHICH information received from the eNB 202 is state #8, the UE 201 performs a UE operation corresponding to the state #8 in step 817. Specifically, the UE 201 stops transmission of the CW #1, and performs initial transmission on the CW #2, waiting for a new grant to be allocated in a PDCCH. Upon receiving a PHICH including the state #8 as described above, the UE 201 should select one of the following two operations.

First, the UE 201 performs initial transmission on the CW #1, and stops transmission of the CW #2. Second, the UE 201 stops transmission of the CW #1, and performs initial transmission on the CW #2. Accordingly, the UE 201 should perform initial transmission on one CW, and stop transmission of the other CW. There are three possible ways to select one of the two CWs. First, the UE 201 may always transmit a CW #1. Second, the UE 201 may compare a CW #1 with a CW #2 in terms of TBS, to transmit a CW with a smaller TBS. Third, the UE 201 may compare a CW #1 with a CW #2 in terms of TBS, to transmit a CW with a greater TBS. If the CW #1 and the CW #2 are equal in TBS, the UE 201 may transmit the CW #1.

Figure 9:
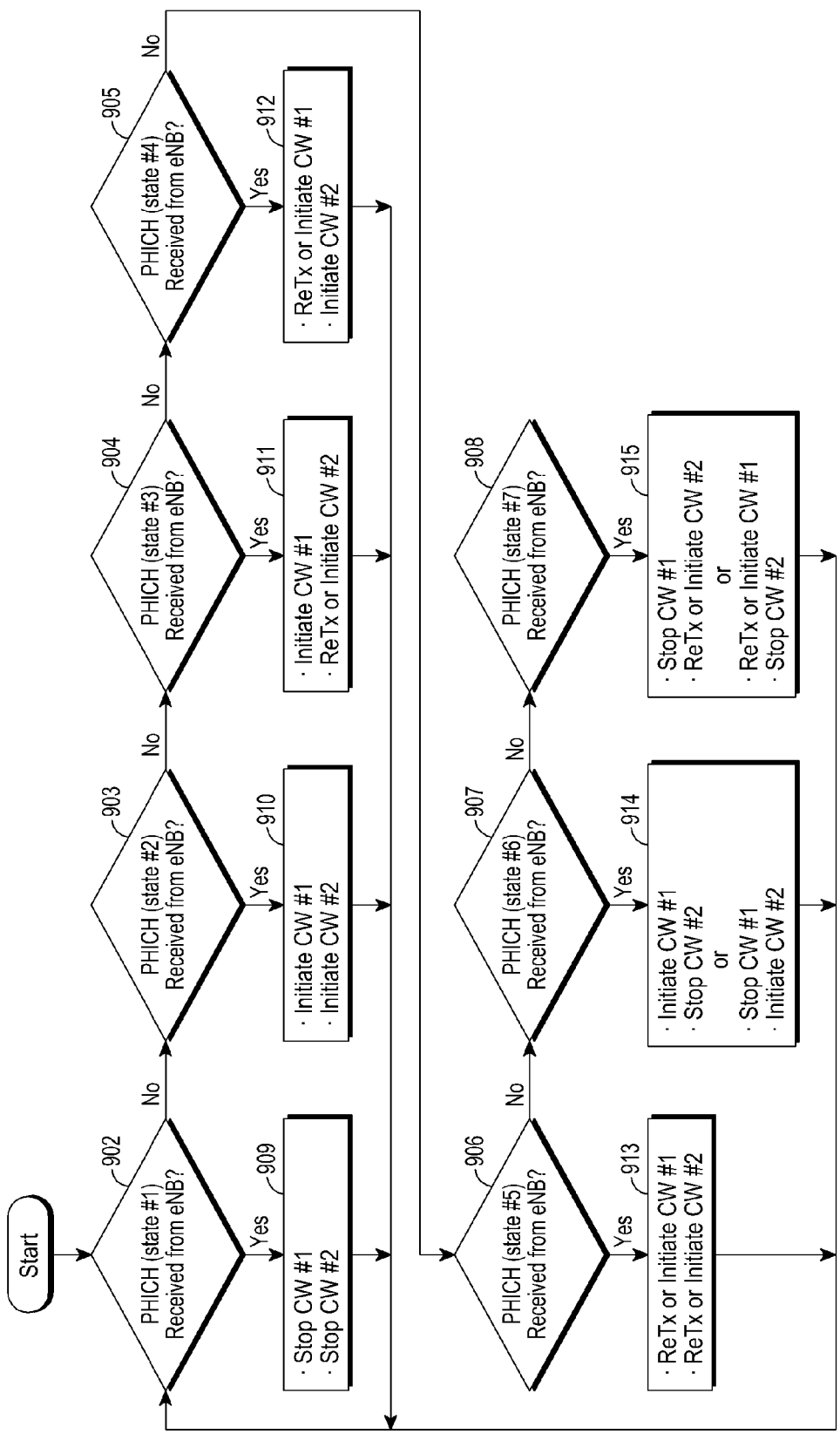
FIG. 9 is a flowchart illustrating a control information reception method in a UE according to a second embodiment of the present invention.

FIG. 9 illustrates a control information reception method in a UE according to a second embodiment of the present invention, in which a UE operation associated with the 7 PHICH states as defined in Table 4 is illustrated.

Generally, A UE 201 maps a UE state indicator included in a PHICH received from an eNB 202 to a table stored in the UE 201, and then performs a UE operation corresponding to the mapped UE state indicator.

In FIG. 9, upon recognizing in step 902 that the PHICH information received from the eNB 202 is state #1, the UE 201 performs a UE operation corresponding to the state #1 in step 906. Specifically, the UE 201 stops transmission of a CW #1 and a CW #2, and waits for new grant information for the CW #1 and the CW #2 to be received over a PDCCH.

Upon recognizing in step 903 that the PHICH information received from the eNB 202 is state #2, the UE 201 performs a UE operation corresponding to the state #2 in step 910. Specifically, the UE 201 performs initial transmission on the CW #1, and performs initial transmission even on the CW #2.

Upon recognizing in step 904 that the PHICH information received from the eNB 202 is state #3, the UE 201 performs a UE operation corresponding to the state #3 in step 911. Specifically, the UE 201 performs initial transmission on the CW #1, and performs retransmission or initial transmission on the CW #2.

Upon recognizing in step 905 that the PHICH information received from the eNB 202 is state #4, the UE 201 performs a UE operation corresponding to the state #4 in step 912. Specifically, the UE 201 performs retransmission or initial transmission on the CW #1, and performs initial transmission on the CW #2.

Upon recognizing in step 906 that the PHICH information received from the eNB 202 is state #5, the UE 201 performs a UE operation corresponding to the state #5 in step 913. Specifically, the UE 201 performs retransmission or initial transmission on the CW #1, and performs retransmission or initial transmission on the CW #2.

Upon recognizing in step 907 that the PHICH information received from the eNB 202 is state #6, the UE 201 performs a UE operation corresponding to the state #6 in step 914. Specifically, the UE 201 performs initial transmission on the CW #1, and stops transmission of the CW #2 and waits for a new grant to be allocated in a PDCCH. In the alternative, upon recognizing in step 907 that the PHICH information received from the eNB 202 is state #6, the UE 201 performs a UE operation corresponding to the state #6 in step 914. Specifically, the UE 201 stops transmission of the CW #1, and performs initial transmission on the CW #2, waiting for a new grant to be allocated in a PDCCH. Upon receiving the state #6 as described above, the UE 201 should select one of the following two operations. First, the UE 201 performs initial transmission on the CW #1, and stops transmission of the CW #2. Second, the UE 201 stops transmission of the CW #1, and performs initial transmission on the CW #2. Accordingly, the UE 201 should perform initial transmission on one CW, and stop transmission of the other CW. There are three possible ways to select one of the two CWs. First, the UE 201 may always transmit a CW #1. Second, the UE 201 may compare a CW #1 with a CW #2 in terms of TBS, to transmit a CW with a smaller TBS. Third, the UE 201 may compare a CW #1 with a CW #2 in terms of TBS, to transmit a CW with a greater TBS. If the CW #1 and the CW #2 are equal in TBS, the UE 201 may transmit the CW #1.

Upon recognizing in step 908 that the PHICH information received from the eNB 202 is state #7, the UE 201 performs a UE operation corresponding to the state #7 in step 915. Specifically, the UE 201 performs retransmission or initial transmission on the CW #1, and stops transmission of the CW #2. In the alternative, upon recognizing in step 908 that the PHICH information received from the eNB 202 is state #7, the UE 201 performs a UE operation corresponding to the state #7 in step 915. Specifically, the UE 201 stops transmission of the CW #1, and perform retransmission or initial transmission on the CW #2. Upon receiving the state #7 as described above, the UE 201 should select one of the following two operations. First, the UE 201 performs retransmission or initial transmission on the CW #1, and stops transmission of the CW #2. Second, the UE 201 stops transmission of the CW #1, and performs retransmission or initial transmission on the CW #2. Accordingly, the UE 201 should perform initial transmission on one CW, and stop transmission of the other CW. There are three possible ways to select one of the two CWs. First, the UE 201 may always transmit a CW #1. Second, the UE 201 may compare a CW #1 with a CW #2 in terms of TBS, to transmit a CW with a smaller TBS. Third, the UE 201 may compare a CW #1 with a CW #2 in terms of TBS, to transmit a CW with a greater TBS. If the CW #1 and the CW #2 are equal in TBS, the UE 201 may transmit the CW #1.

Figure 10:
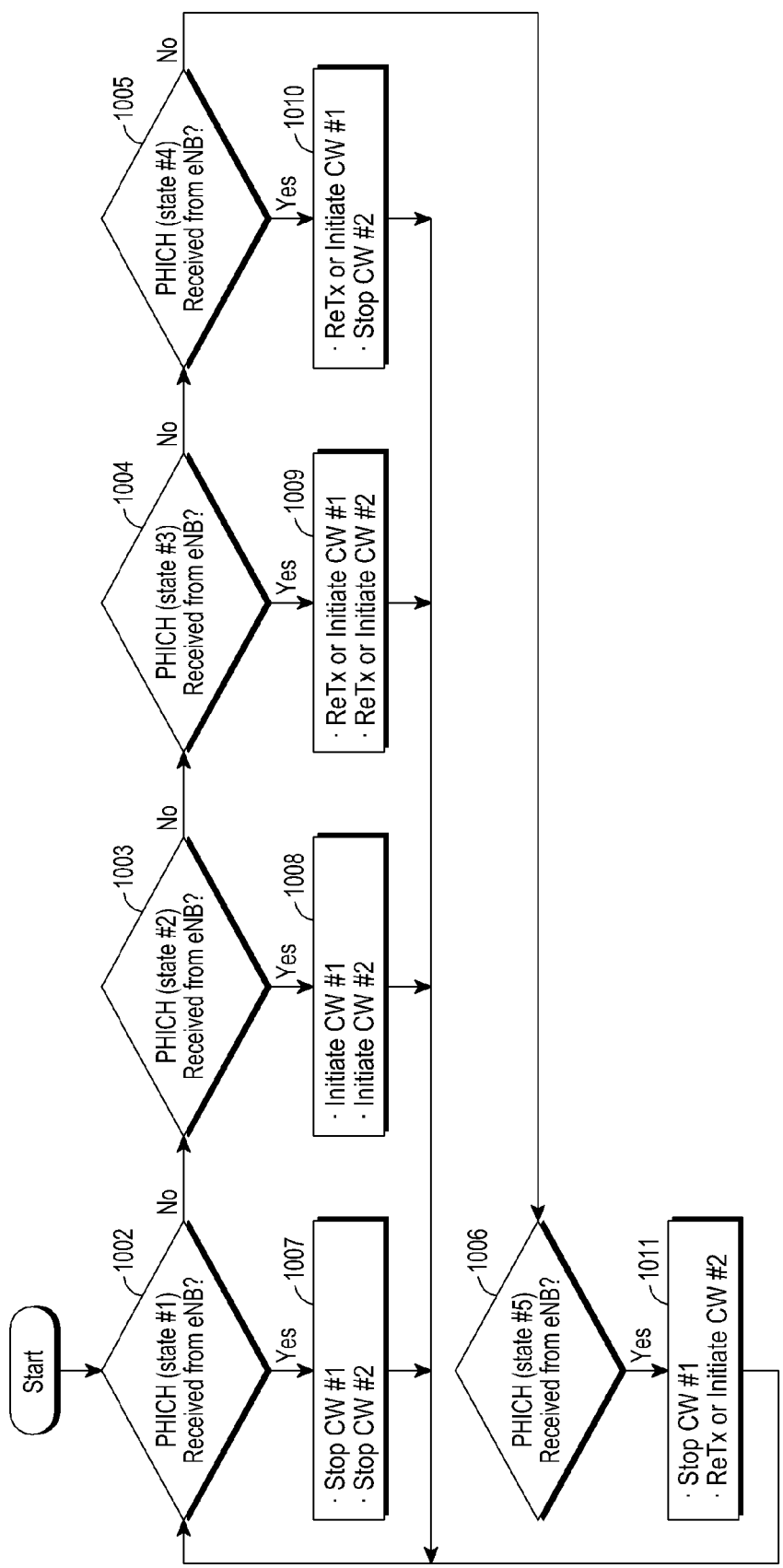
FIG. 10 is a flowchart illustrating a control information reception method in a UE according to a third embodiment of the present invention.

FIG. 10 illustrates a control information reception method in a UE according to a third embodiment of the present invention, in which a UE operation associated with the 5 PHICH states as defined in Table 5 is illustrated.

Generally, a UE 201 maps a UE state indicator included in a PHICH received from an eNB 202 to a table stored in the UE 201, and then performs a UE operation corresponding to the mapped UE state indicator.

Referring to FIG. 10, upon recognizing in step 1002 that the PHICH information received from the eNB 202 is state #1, the UE 201 performs a UE operation corresponding to the state #1 in step 1007. Specifically, the UE 201 stops transmission of a CW #1 and a CW #2, and waits for new grant information for the CW #1 and the CW #2 to be received over a PDCCH.

Upon recognizing in step 1003 that the PHICH information received from the eNB 202 is state #2, the UE 201 performs a UE operation corresponding to the state #2 in step 1008. Specifically, the UE 201 performs initial transmission the CW #1, and performs initial transmission even on the CW #2. In the initial transmission, the UE 201 uses previously allocated grant information, instead of being allocated new grant information from the eNB 202 through a PDCCH.

Upon recognizing in step 1004 that the PHICH information received from the eNB 202 is state #3, the UE 201 performs a UE operation corresponding to the state #3 in step 1009. Specifically, the UE 201 performs retransmission or initial transmission on the CW #1, and performs retransmission or initial transmission on the CW #2.

Upon recognizing in step 1005 that the PHICH information received from the eNB 202 is state #4, the UE 201 performs a UE operation corresponding to the state #4 in step 1010. Specifically, the UE 201 performs retransmission or initial transmission on the CW #1, and stops transmission of CW #2.

Upon recognizing in step 1006 that the PHICH information received from the eNB 202 is state #5, the UE 201 performs a UE operation corresponding to the state #5 in step 1011. Specifically, the UE 201 stops transmission of the CW #1, and performs retransmission or initial transmission on the CW #2.

After receiving one-state information included in a PHICH of the present invention and defined in at least one of Tables 2 to 5 configured to include combinations of ACK, NACK, STOP, and CONTINUE, the UE 201 determines if state information in its own table is identical to the state information included in a PHICH received from the eNB 202. If the state information is not identical, the UE 201 performs transmission according to the PDCCH indication.

For example, when state information included in a PHICH is state #3 as defined in Table 3, is transmitted by the eNB 202, instructing to perform initial transmission on a CW #1 and perform retransmission on a CW #2, the UE 201 performs initial transmission on the CW #1 and the CW #2 according to the PDCCH indication, if a new grant for initial transmission on the CW #1 and the CW #2 is allocated using a PDCCH in the same subframe.

Figure 11:
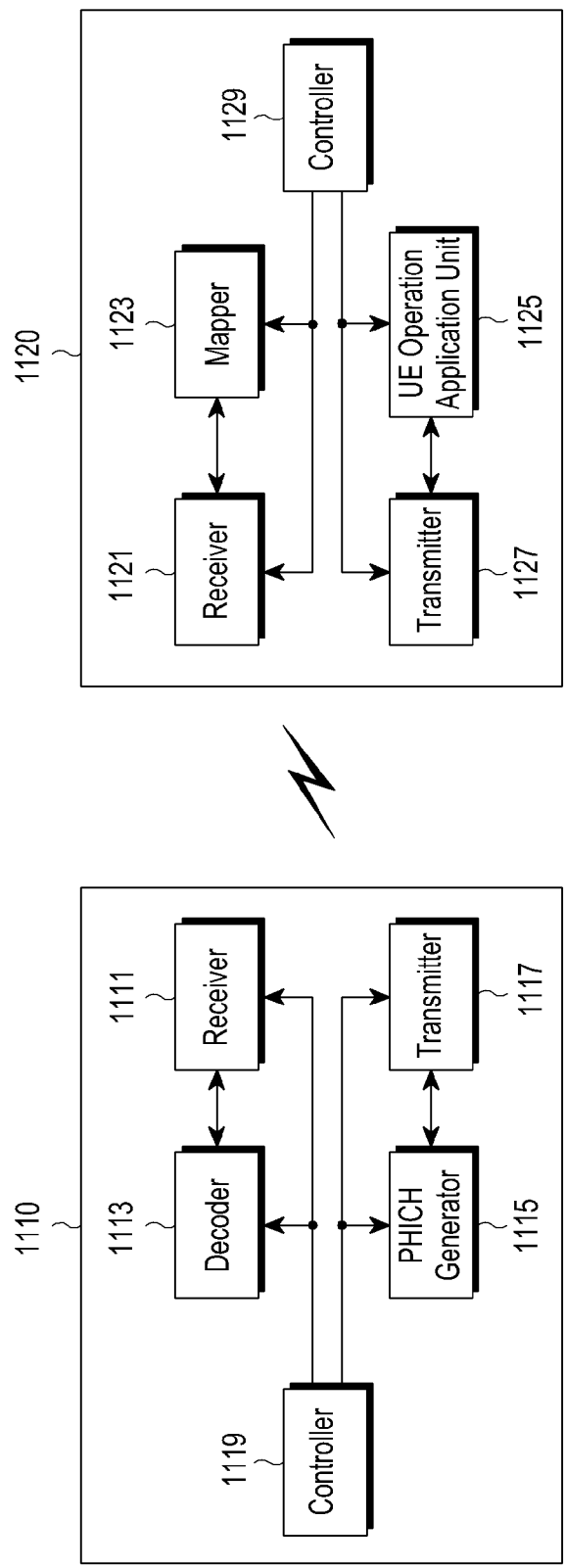
FIG. 11 is a block diagram of an eNB and a UE according to an embodiment of the present invention.

FIG. 11 is a block diagram of an eNB and a UE according to an embodiment of the present invention.

Referring to FIG. 11, an eNB 1110 includes a receiver 1111, a decoder 1113, a PHICH generator 1115, a transmitter 1117, and a controller 1119.

The receiver 1111 receives a CW #1 and a CW #2 from a UE 1120 in response to the PDCCH that the eNB 110 transmitted to the UE 1120.

The decoder 1113 decodes the CW #1 and the CW #2 provided from the receiver 1111.

The PHICH generator 1115 determines one-state information defined in any one of the state Tables 2 to 5 configured to include combinations of ACK, NACK, Stop, and Continue, taking into account the decoding results by the decoder 1113 and the states of the codewords, and generates a PHICH including the determined state information.

The transmitter 1117 transmits the PHICH generated by the PHICH generator 1115, to the UE 1120.

The controller 1119 controls the receiver 1111, the decoder 1113, the PHICH generator 1115, and the transmitter 1117, to control transmission of 2 CWs by a UE only with PHICH transmission without PDCCH transmission.

The UE 1120 includes a receiver 1121, a mapper 1123, a UE operation application unit 1125, a transmitter 1127, and a controller 1129.

The receiver 1121 receives a PHICH from the eNB 1110.

The mapper 1123 maps state information included in the PHICH received by the receiver 1121 to a table stored in the UE 1120.

The UE operation application unit 1125 executes an operation corresponding to one-state information from the eNB 1110 according to the mapping result by the mapper 1123, referring to one of Tables 2 to 5.

The transmitter 1127 transmits a CW #1 and a CW #2 to the eNB 1110. In transmitting the CW #1 and the CW #2, the transmitter 1127 may perform retransmission, initial transmission, or transmission stop on the CW #1 and the CW #2 according to the UE operation applied by the UE operation application unit 1125.

The controller 1129 controls the receiver 1121, the mapper 1123, the UE operation application unit 1125, and the transmitter 1127, to apply a UE operation corresponding to the state information included in a PHICH received from the eNB 1110 according to any one of Tables 2 to 5.

While using 16 states makes it possible to more precisely represent states configured to include combinations of ACK, NACK, STOP, and CONTINUE, using 5 states is excellent in terms of system performance.

A block code used in the present invention is formed in an 8×8 Hadamard matrix given in Matrix (2) below. By deleting the first column from the matrix in Matrix (2), an 8×7 matrix is formed as defined by Matrix (3). An 8×6 matrix in Matrix (4) is constructed by eliminating the first column from the matrix of Matrix (3). That is, a (6, 3) block code is constructed that can represent 8 states like Matrix (4). In the alternative, an 8×6 matrix in Matrix (4) may be made by deleting another column from the matrix of Matrix (3) in the same manner.

Matrix (2)

| 0 | 0 | 0 | 0 | 0 | 0 | 0 | 0 |
| 0 | 1 | 0 | 1 | 0 | 1 | 0 | 1 |
| 0 | 0 | 1 | 1 | 0 | 0 | 1 | 1 |
| 0 | 1 | 1 | 0 | 0 | 1 | 1 | 0 |
| 0 | 0 | 0 | 0 | 1 | 1 | 1 | 1 |
| 0 | 1 | 0 | 1 | 1 | 0 | 1 | 0 |
| 0 | 0 | 1 | 1 | 1 | 1 | 0 | 0 |
| 0 | 1 | 1 | 0 | 1 | 0 | 0 | 1 |

Matrix (3)

| 0 | 0 | 0 | 0 | 0 | 0 | 0 |
| 1 | 0 | 1 | 0 | 1 | 0 | 1 |
| 0 | 1 | 1 | 0 | 0 | 1 | 1 |
| 1 | 1 | 0 | 0 | 1 | 1 | 0 |
| 0 | 0 | 0 | 1 | 1 | 1 | 1 |
| 1 | 0 | 1 | 1 | 0 | 1 | 0 |
| 0 | 1 | 1 | 1 | 1 | 0 | 0 |
| 1 | 1 | 0 | 1 | 0 | 0 | 1 |

Matrix (4)

| 0 | 0 | 0 | 0 | 0 | 0 |
| 0 | 1 | 0 | 1 | 0 | 1 |
| 1 | 1 | 0 | 0 | 1 | 1 |
| 1 | 0 | 0 | 1 | 1 | 0 |
| 0 | 0 | 1 | 1 | 1 | 1 |
| 0 | 1 | 1 | 0 | 1 | 0 |
| 1 | 1 | 1 | 1 | 0 | 0 |
| 1 | 0 | 1 | 0 | 0 | 1 |

TABLE 6

| (6, 3) block code | | | | | | distance |
|---|---|---|---|---|---|---|
| 0 | 0 | 0 | 0 | 0 | 0 | 0 |
| 0 | 1 | 0 | 1 | 0 | 1 | 3 |
| 1 | 1 | 0 | 0 | 1 | 1 | 4 |
| 1 | 0 | 0 | 1 | 1 | 0 | 3 |
| 0 | 0 | 1 | 1 | 1 | 1 | 4 |
| 0 | 1 | 1 | 0 | 1 | 0 | 3 |
| 1 | 1 | 1 | 1 | 0 | 0 | 4 |
| 1 | 0 | 1 | 0 | 0 | 1 | 3 |

Table 6 above shows the minimum inter-code distances in the (6, 3) block code of Matrix (4). In Table 6, the minimum inter-code distances between {0, 0, 0, 0, 0, 0} and {1, 1, 0, 0, 1, 1}, {0, 0, 1, 1, 1, 1} and {1, 1, 1, 1, 0, 0} are 4.

The 8 codes referenced in Table 6 may be used to represent the 8 states shown in Table 3.

As an alternative, 4 codewords (e.g., {0, 0, 0, 0, 0, 0}, {1, 1, 0, 0, 1, 1}, {0, 0, 1, 1, 1, 1}, {1, 1, 1, 1, 0, 0}), whose inter-code distance is 4, may be mapped to 4 states in Table 7 below one by one. That is, after an eNB instructs a UE to use the 4 states in Table 7, the eNB and the UE communicate with each other using the above 4 codewords whose inter-code distance is 4. By using only the 4 codewords whose inter-code distance is 4, the PHICH reception performance may be improved.

TABLE 7

| ACK/NACK | | CW #1 | CW #2 | States |
|---|---|---|---|---|
| ACK1 | ACK2 | Stop | Stop | state #1 |
| NACK1 | ACK2 | Continue | Stop | state #2 |
| ACK1 | NACK2 | Stop | Continue | state #3 |
| NACK1 | NACK2 | Continue | Continue | state #4 |

Figure 12:
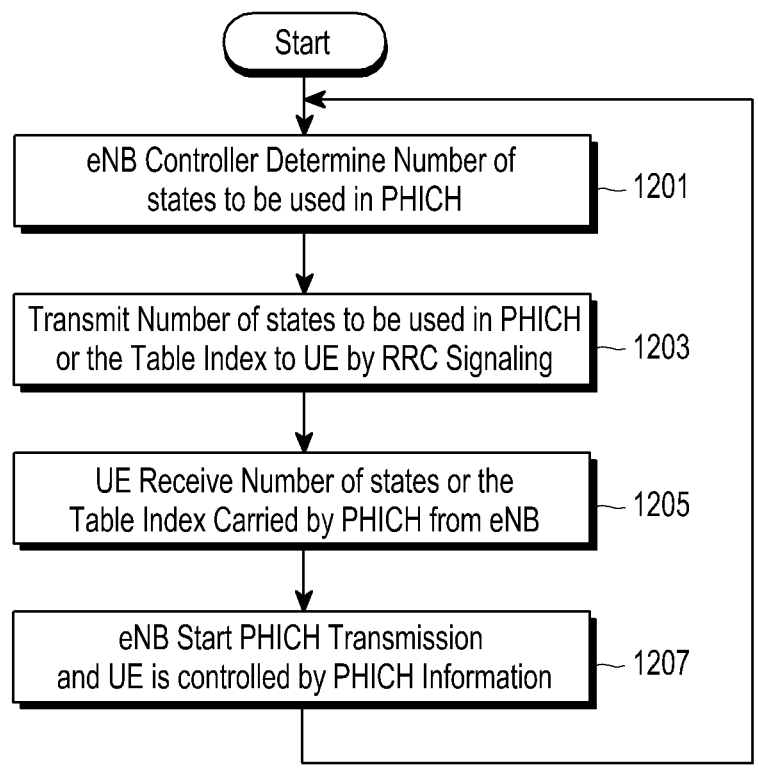
FIG. 12 is a flowchart illustrating a signaling method between an eNB and a UE according to an embodiment of the present invention.

FIG. 12 illustrates a signaling method between an eNB and a UE according to an embodiment of the present invention, in which the eNB determines a state and then signals the determined state to the UE.

Referring to FIG. 12, a controller of an eNB determines the number of states to be used for the proposed PHICH in step 1201. For example, if the eNB determines to use 7 states, the eNB informs a UE of the number of states by Radio Resource Control (RRC) signaling, or informs the UE of a table index corresponding to the determined number of states, in step 1203. In step 1205, the UE receives information about the number of states and the associated table index, from the eNB, making it possible to determine which table the eNB and the UE will use to analyze PHICH information. After the UE receives the information about the number of states and the associated table index from the eNB, the eNB controls transmission of the UE using the proposed PHICH information in step 1207. If the eNB wants to change the number of states transmitted in a PHICH, the eNB informs the UE of the new number of states or its associated table index in step 1203 after returning to step 1201.

While the present invention has been shown and described with reference to certain embodiments above, it will be understood by those skilled in the art that various changes in form and details may be made therein without departing from the spirit and scope of the invention as defined by the appended claims.

What is claimed is:

1. A method for transmitting control information by an enhanced Node B (eNB) in a wireless communication system supporting Multiple-Input Multiple-Output (MIMO) technology, the method comprising:
   transmitting at least one parameter required for initial transmission of a User Equipment (UE) through a Packet Data Control Channel (PDCCH);
   receiving at least two codewords from the UE and decoding the received codewords;
   determining one of a plurality of indicators indicating decoding results of the at least two codewords and an operation state of the UE based on the decoding results of the at least two codewords;
   transmitting the determined indicator through a Physical Hybrid ARQ indicator channel (PHICH); and
   receiving at least one codeword that the UE generates and transmits based on the parameter required for initial transmission of the UE and the determined indicator.

2. The method of claim 1, wherein when a number of the plurality of indicators is 8, the determined indicator is transmitted through the PHICH using 3 bits.

3. The method of claim 1, wherein the parameter required for the initial transmission includes at least one of a location and a size of a resource allocated to the UE, a Modulation and Coding Scheme-Redundancy Version (MCS-RV), and a New Data Indicator (NDI).

4. The method of claim 1, wherein the plurality of indicators are allocated according to a minimum inter-code distance in a block code.

5. The method of claim 4, wherein when the block code is a (6, 3) block code, the minimum inter-code distance is 4.

6. An enhanced Node B (eNB) apparatus for transmitting control information in a wireless communication system supporting Multiple-Input Multiple-Output (MIMO) technology, the eNB apparatus comprising:
   a transmitter for transmitting at least one parameter required for initial transmission of a User Equipment (UE) through a Packet Data Control Channel (PDCCH);
   a receiver for receiving at least two codewords from the UE;
   a decoder for decoding the at least two codewords; and
   a Physical Hybrid ARQ indicator channel (PHICH) generator for determining one of a plurality of indicators indicating decoding results of the at least two codewords and an operation state of the UE based on the decoding results of the at least two codewords, and generating a PHICH including the determined indicator,
   wherein the transmitter transmits the generated PHICH to the UE, and
   wherein the receiver receives at least one codeword that the UE generates and transmits based on the parameter required for initial transmission of the UE and the determined.

7. The eNB apparatus of claim 6, wherein when a number of the plurality of indicators is 8, the determined indicator is transmitted through the PHICH using 3 bits.

8. The eNB apparatus of claim 6, wherein the parameter required for the initial transmission includes at least one of a location and a size of a resource allocated to the UE, a Modulation and Coding Scheme-Redundancy Version (MCS-RV), and a New Data Indicator (NDI).

9. The eNB apparatus of claim 6, wherein the plurality of indicators are allocated according to a minimum inter-code distance in a block code.

10. The eNB apparatus of claim 9, wherein when the block code is a (6, 3) block code, the minimum inter-code distance is 4.

11. A method for receiving control information by a User Equipment (UE) in a wireless communication system supporting Multiple-Input Multiple-Output (MIMO) technology, the method comprising:
   receiving at least one parameter required for initial transmission of the UE from an enhanced Node B (eNB) through a Packet Data Control Channel (PDCCH);
   transmitting at least two codewords to the eNB;
   receiving a Physical Hybrid ARQ indicator channel (PHICH) from the eNB;
   mapping an indicator, which is included in the PHICH, to one of a plurality of indicators indicating decoding results of the at least two codewords and an operation state of the UE based on the decoding results of the at least two codewords, which are stored in the UE;
   applying an operation corresponding to the indicator according to the mapping result; and
   transmitting at least one codeword to the eNB based on the parameter required for initial transmission of the UE and the indicator according to the mapping result.

12. The method of claim 11, wherein when a number of the plurality of indicators is 8, the indicator included in the PHICH is transmitted using 3 bits.

13. The method of claim 11, wherein the parameter required for the initial transmission includes at least one of a location and a size of a resource allocated to the UE, a Modulation and Coding Scheme-Redundancy Version (MCS-RV), and a New Data Indicator (NDI).

14. The method of claim 11, wherein the plurality of indicators are allocated according to a minimum inter-code distance in a block code.

15. The method of claim 14, wherein when the block code is a (6, 3) block code, the minimum inter-code distance is 4.

16. A User Equipment (UE) apparatus for receiving control information in a wireless communication system supporting Multiple-Input Multiple-Output (MIMO) technology, the UE apparatus comprising:
   a receiver for receiving at least one parameter required for initial transmission of the UE from an enhanced Node B (eNB) through a Packet Data Control Channel (PDCCH), and receiving a Physical Hybrid ARQ indicator channel (PHICH) from the eNB;
   a transmitter for transmitting at least two codewords to the eNB;
   a mapper for mapping an indicator, which is included in the PHICH, to one of a plurality of indicators indicating decoding results of the at least two codewords and an operation state of the UE based on the decoding results of the at least two codewords, which are stored in the UE; and
   a UE operation application unit for applying an operation corresponding to the indicator according to the mapping result,
   wherein the transmitter transmits at least one codeword to the eNB based on the parameter required for initial transmission of the UE and the indicator according to the mapping result.

17. The UE apparatus of claim 16, wherein when a number of the plurality of indicators is 8, the indicator included in the PHICH is transmitted using 3 bits.

18. The UE apparatus of claim 16, wherein the parameter required for the initial transmission includes at least one of a location and a size of a resource allocated to the UE, a Modulation and Coding Scheme-Redundancy Version (MCS-RV), and a New Data Indicator (NDI).

19. The UE apparatus of claim 16, wherein the plurality of indicators are allocated according to a minimum inter-code distance in a block code.

20. The UE apparatus of claim 19, wherein when the block code is a (6, 3) block code, the minimum inter-code distance is 4.

* * * * *